(12) United States Patent
Yamamoto et al.

(10) Patent No.: US 7,886,109 B2
(45) Date of Patent: Feb. 8, 2011

(54) STORAGE SYSTEM COUPLED TO MANAGEMENT SERVER AND A MONITORING METHOD OF A STOPPED DEVICE EXECUTED BY THE STORAGE SYSTEM

(75) Inventors: Yasutomo Yamamoto, Kanagawa (JP); Akira Yamamoto, Kanagawa (JP); Naoto Matsunami, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/435,429

(22) Filed: May 5, 2009

(65) Prior Publication Data

US 2009/0217061 A1 Aug. 27, 2009

Related U.S. Application Data

(63) Continuation of application No. 11/138,473, filed on May 27, 2005, now Pat. No. 7,546,414.

(30) Foreign Application Priority Data

Mar. 31, 2005 (JP) ............................. 2005-102486

(51) Int. Cl.
*G06F 12/00* (2006.01)
*G06F 11/07* (2006.01)
*G06F 1/26* (2006.01)

(52) U.S. Cl. ...................... 711/111; 711/112; 711/154; 713/300; 714/48; 714/E11.025

(58) Field of Classification Search .................. 711/115, 711/162, 170, 111, 112, 154; 713/300; 714/48, 714/E11.025
See application file for complete search history.

(56) References Cited

U.S. PATENT DOCUMENTS

| 6,098,129 | A | 8/2000 | Fukuzawa et al. |
| 7,228,380 | B2 | 6/2007 | Yamamoto et al. |
| 2003/0221077 | A1 | 11/2003 | Ohno et al. |
| 2004/0139168 | A1* | 7/2004 | Tanaka et al. ............... 709/213 |
| 2004/0143832 | A1 | 7/2004 | Yamamoto et al. |
| 2004/0257857 | A1 | 12/2004 | Yamamoto et al. |
| 2007/0214317 | A1 | 9/2007 | Kalos et al. |

FOREIGN PATENT DOCUMENTS

| JP | 10283272 | 10/1998 |
| JP | 2001093220 | 4/2001 |
| JP | 2004005370 | 1/2004 |
| JP | 20042204050 | 8/2004 |
| JP | 2005011277 | 1/2005 |
| JP | 2005283272 | 1/2005 |
| WO | 03067385 | 9/2003 |

* cited by examiner

*Primary Examiner*—Mardochee Chery
(74) *Attorney, Agent, or Firm*—Brundidge & Stanger, P.C.

(57) ABSTRACT

A computer system, storage system, and device control method which keep and operate long-term data stored in a disk device using its characteristics for a long time and at low cost, in a storage system or in a storage system using an external storage connection method. A computer system comprises a host computer, a storage system, and a management server, which are connected to one another via a network. The storage system receives a request to detach a logical device, specifies a logical device to be processed with information included in the request and a physical device corresponding to the relevant logical device, releases a definition of a host path of the logical device, and stops the physical device.

12 Claims, 16 Drawing Sheets

FIG.3

LOGICAL DEVICE MANAGEMENT INFORMATION 201

301 : LOGICAL DEVICE NUMBER
302 : SIZE
303: CORRESPONDING PHYSICAL / EXTERNAL DEVICE NUMBER
304 : TYPE
305 : DEVICE STATUS
306 : STOP FLAG
307: PORT NUMBER, TARGET ID, AND LUN LIST
308 : NAME OF CONNECTED HOST

| LDEV # | Size | PDEV# /EDEV# | Type | Status | Stop flag | Port#,TID,LUN | | ..... | Hosts | ...... |
|---|---|---|---|---|---|---|---|---|---|---|
| 0 | 120GB | "PD",0 | xxx_A | attached | on | 0,AA,1 | 1,AA,1 | ..... | hostA | ...... |
| 1 | 360GB | "PD",1 | xxx_A | attached | on | 0,AA,9 | 1,AA,2 | ..... | hostA | ...... |
| 2 | 840GB | "PD",2 | xxx_A | blocked | on | 2,AA,4 | 3,AA,2 | ..... | hostB | ...... |
| 10 | 512GB | "ED",0 | xxx_A | attached | on | 0,BB,6 | 1,BB,6 | ..... | hostC | ...... |
| 11 | 320GB | "ED",1 | xxx_B | detached | on | — | — | ..... | — | ...... |
| 12 | 640GB | "ED",2 | xxx_B | blocked | on | 0,BB,7 | 1,BB,7 | ..... | hostC | ...... |
| 20 | 360GB | "PD",15 | xxx_A | attached | on | 2,BB,6 | 3,BB,6 | ..... | hostD | ...... |
| 21 | 120GB | "PD",16 | xxx_B | detached | off | — | — | ..... | — | ...... |
| 22 | 240GB | "PD",17 | xxx_A | attached | on | 2,BB,7 | 3,BB,7 | ..... | hostD | ...... |
| 30 | 180GB | "ED",15 | xxx_A | detached | off | — | — | ..... | — | ...... |
| 31 | 900GB | "ED",16 | xxx_B | attached | on | 0,CC,3 | 1,CC,3 | ..... | hostA | ...... |
| 32 | 960GB | "ED",17 | xxx_A | detached | on | — | — | ..... | — | ...... |
| 33 | — | — | — | unmounted | — | — | — | ..... | — | ...... |

FIG.4

LU PATH MANAGEMENT INFORMATION 202

401: PORT NUMBER
402: TARGET ID AND LUN
403: CORRESPONDING LOGICAL DEVICE NUMBER
404: NAME OF CONNECTED HOST

| Port# | TID,LUN | LDEV# | Hosts |
|---|---|---|---|
| 0 | AA,0 | — | — |
|   | AA,1 | 0 | hostA |
|   | ... | | |
|   | AA,9 | 1 | hostA |
|   | ... | | |
|   | BB,6 | 10 | hostC |
|   | BB,7 | 12 | hostC |
|   | ... | | |
|   | CC,3 | 21 | hostA |
|   | ... | | |
| 1 | AA,0 | — | — |
|   | AA,1 | 0 | hostA |
|   | AA,2 | 1 | hostA |
|   | ... | | |
|   | BB,6 | 10 | hostC |
|   | BB,7 | 12 | hostC |
|   | ... | | |
|   | CC,3 | 31 | hostA |
|   | ... | | |

FIG.5

PHYSICAL DEVICE MANAGEMENT INFORMATION 203

- 501 : PHYSICAL DEVICE NUMBER
- 502 : SIZE
- 503 : CORRESPONDING PHYSICAL DEVICE NUMBER
- 504 : DEVICE STATUS
- 505 : STOP FLAG
- 506 : LAST STOP TIME
- 507 : RAID CONFIGURATION ( RAID LEVEL, DATA/NUMBER OF PARITIES, AND STRIPE SIZE )
- 508 : LIST OF DISK NUMBER
- 509 : SIZE AND OFFSET IN DISK DEVICE

| PDEV # | Size | LDEV # | Status | Stop flag | Last Stop Time | RAID Config. | List of disk# | Size and offset in disk | |
|---|---|---|---|---|---|---|---|---|---|
| 0 | 120GB | 0 | attached | on | — | RAID1 1D+1P,64KB | 0,1 | 120GB | 0 |
| 1 | 360GB | 1 | attached | on | — | RAID5 3D+1P,64KB | 2,3,4,5 | 120GB | 0 |
| 2 | 840GB | 2 | Blocked | on | | RAID5 7D+1P,256KB | 6,7,8,9,10, 11,12,13 | 120GB | 0 |
| ⋮ | | | | | | | | | |
| 15 | 360GB | 20 | attached | on | — | RAID5 3D+1P,64KB | 20,21,22, 23 | 120GB | 0 |
| 16 | 120GB | 21 | attached | off | 02/02/14 20:48:36 | RAID1 1D+1P,256KB | 24,25 | 120GB | 0 |
| 17 | 240GB | 22 | attached | on | — | RAID1 2D+2P,256KB | 30,31,32, 33 | 120GB | 0 |
| 18 | 360GB | — | detached | on | — | RAID5 3D+1P,64KB | 36,37,38, 39 | 120GB | 0 |
| 19 | — | — | un-mounted | — | — | — | — | — | |
| ⋮ | | | | | | | | | |

FIG.6

EXTERNAL DEVICE MANAGEMENT INFORMATION 204

- 601 : EXTERNAL DEVICE NUMBER
- 602 : SIZE
- 603 : CORRESPONDING LOGICAL DEVICE NUMBER
- 604 : DEVICE STATUS
- 605 : STOP FLAG
- 606 : LAST STOP TIME
- 607 : STORAGE IDENTIFIER
- 608 : DEVICE NUMBER IN EXTERNAL STORAGE
- 609 : LIST OF INITIATOR PORT NUMBER
- 610 : TARGET PORT ID, TARGET ID, AND LUN LIST

| EDEV # | Size | LDEV # | Status | stop flag | Last Stop Time | Ex. Str ID | LDEV# in Ex. Str | Init. Port# | Target PortID,TID,LUN | | |
|---|---|---|---|---|---|---|---|---|---|---|---|
| 0 | 512 GB | 10 | attached | on | — | ABC | 0 | 0,1 | AA,AA,1 | BB,AA,1 | .... |
| 1 | 320 GB | 11 | attached | on | — | ABC | 1 | 0,1 | AA,AA,9 | BB,AA,2 | .... |
| 2 | 640 GB | 12 | blocked | on | — | DEF | 2 | 2,3 | AC,AA,4 | AD,AA,2 | .... |
| ⋮ | | | | | | | | | | | |
| 15 | 180 GB | 30 | attached | off | 03/07/20 09:58:30 | ABC | 10 | 0,1 | AA,AA,5 | BB,AA,6 | .... |
| 16 | 900 GB | 31 | attached | on | — | DEF | 20 | 2,3 | AC,AA,8 | AD,AA,4 | .... |
| 17 | 960 GB | 32 | attached | on | — | DEF | 21 | 2,3 | AC,AA,6 | AD,AA,9 | .... |
| 18 | 960 GB | — | detached | on | — | DEF | 22 | 2,3 | AC,AA,7 | AD,AA,8 | .... |
| 19 | — | — | un-mounted | — | — | — | — | — | — | — | .... |
| ⋮ | | | | | | | | | | | |

FIG.7

DETACHED DEVICE BACKUP INFORMATION 207

701 : EXTERNAL DEVICE NUMBER

702 : COPY OF LOGICAL DEVICE MANAGEMENT INFORMATION

703 : COPY OF DEVICE FUNCTION MANAGEMENT INFORMATION

| EDEV# | COPY OF LDEV MANAGEMENT INFORMATION | | | | | COPY OF DEVICE FUNCTION MANAGEMENT INFORMATION | | | | |
|---|---|---|---|---|---|---|---|---|---|---|
| | LDEV# | Size | PDEV# /EDEV# | Type | ..... | LDEV# | ACCESS CONTROL (HBA#) | ACCESS ATTRIBUTE | ENCRYPTION | ..... |
| 0 | 10 | 512GB | "ED",0 | xxx_A | ..... | 10 | WNA1,WNA2 | — | Yes | ..... |
| 1 | 11 | 320GB | "ED",1 | xxx_B | ..... | 11 | WNB1,WNB2 | — | — | ..... |
| 2 | 12 | 640GB | "ED",2 | xxx_B | ..... | 12 | WNB1,WNB2 | — | — | ..... |
| ⋮ | | | | | | | | | | |
| 15 | 30 | 180GB | "ED",15 | xxx_A | ..... | 30 | — | WR:Once RD:Few | Yes | ..... |
| 16 | 31 | 900GB | "ED",16 | xxx_B | ..... | 31 | WNB1,WNB2 | — | — | ..... |
| 17 | 32 | 960GB | "ED",17 | Xxx_A | ..... | 32 | WNA1,WNA2 | WR:Once RD:Many | Yes | ..... |
| ⋮ | | | | | | | | | | |

STORAGE SYSTEM COUPLED TO MANAGEMENT SERVER AND A MONITORING METHOD OF A STOPPED DEVICE EXECUTED BY THE STORAGE SYSTEM

CROSS-REFERENCE TO RELATED APPLICATIONS

The present application is a continuation of application Ser. No. 11/138,473, filed May 27, 2005, now U.S. Pat. No. 7,546, 414; claims priority to Japanese patent application No. 2005-102486 filed on Mar. 31, 2005, the entire contents of which are hereby incorporated by reference.

BACKGROUND OF THE INVENTION

The present invention relates to a storage system which stores data to be used by a computer in a computer system. More specifically, the present invention relates to a control method of a first storage system which can connect a host to one or more second storage systems and virtualize a device in the second storage system as its own device.

DESCRIPTION OF THE RELATED ART

With rapid progresses of information systems, such as easing of regulations of electronic storages, expansion of Internet businesses, documentation in electronic form of procedures, or the like, a rapid increase in the amount of data is drastically exhibited. In addition to such a rapid increase in the amount of data, demands by customers for long-term storage of business activity histories (business information, mail or the like) of an enterprise through a data backup to a disk device (Disk-to-Disk Backup) or a countermeasure against an inspection are increasing, and thus data to be stored in a storage system continues increasing rapidly. Accordingly, in an enterprise information system, a storage system of each division or each system is increased and the management of a complicated IT infrastructure is simplified or made efficient. In particular, expectations for simplification of the management of a storage device and the optimization of total cost by utilizing an optimum storage system according to the value of data are increasing.

As a method of reducing the management cost of a large-scale storage system, a storage virtualization technique as disclosed in Japanese Patent Laid-Open Publication No. 2005-11277 (Patent Document 1) is exemplified. Patent Document 1 discloses a storage virtualization technique (hereinafter, referred to as an external storage connection method) in which a first storage system is connected to one or more second storage systems and a device (hereinafter, referred to as a logical device) connected to a higher-level device such as a host or the like by the second storage system is provided to the host as a logical device of the first storage system therethrough. When receiving a request for input/output to a logical device from the host, the first storage system judges whether a device to be accessed corresponds to either a logical device of the second storage system or a physical device such as a disk device in the first storage system and allocates the request for input/output to a proper access destination according to the result of judgment.

By using the storage system having the external storage connection method disclosed in Patent Document 1, a storage system in which a plurality of storage systems having different attributes such as performance, reliability, cost, or the like are unified can be constructed. For example, by connecting an expensive, high-performance, high-reliability first storage system having an external storage connection method to a plurality of inexpensive, low-performance, low-reliability second storage systems, a tiered storage system capable of optimum data arrangement according to freshness or value of data can be implemented. By using such a tiered storage system, for the purpose of coping with the inspection, a large amount of information such as business information, mail, or the like on daily business activities can be stored for a long period at optimum cost according to the value of the respective information.

However, when the large amount of data is stored for a long period, as described above, it is important to keep and operate a large-scale storage device for storing the large amount of data at lower cost. For example, a large amount of power is consumed so as to drive the large-scale storage device, and thus power consumption needs to be reduced. Further, a storage period of data ranging from several years to tens years may exceed a life span of a storage device, thus the replacement of the storage device is indispensable during the long-term storage. Accordingly, in order to reduce the cost for data storage, it is preferable that the life span of the storage device is extended as long as possible and that the number of replacement times of the storage device is reduced.

On the other hand, most of data stored for a long period as described above is an archive such as business transaction information or mail. This type of data is most unlikely to be used in daily businesses.

SUMMARY OF THE INVENTION

It is an object of the present invention to keep and use data stored for a long time in a disk device using its characteristics at low cost for a long period, in a storage system or in a storage system using an external storage connection method.

A storage system and a management server perform detach and attach operations of a specific device in a storage system and, if necessary, stop and start operations of a disk device corresponding to the relevant device according to an instruction from a user or an application program. As regards the device detach operation, it is judged whether or not a target device needs to be stopped, a definition of an LU path is released, and, when necessary, a disk device corresponding to the relevant device is stopped. Further, as regards the device attach operation, a device corresponding to the relevant device is started and an LU path of the relevant device is defined.

As another embodiment, a first storage system is disposed between a host and a second storage system and the first storage system having an external storage connection method for providing a device of the second storage system as its own device and a management server performs detach and attach operations a first device of the first storage system corresponding to a second device of the second storage system and, if necessary, stop and start operations of the second device corresponding to the first device according to an instruction from a user or an application program. As regards the device detach operation, it is judged whether or not the first device needs to be stopped, a definition of an LU path of the first device is released, when necessary, the second storage system is instructed to stop the second device, and, after receiving the stop completion of the second device from the second storage system, the correspondence between the first device and the second device is released. In addition, as regards the device attach operation, the second storage system is instructed to start the second device, the first device is associated with the second device after receiving the stop completion of the second device from the second storage system, and an LU path of the first device is defined.

As still another embodiment, a first storage system is disposed between a plurality of second storage systems and a host and has an external storage connection method for providing devices of the second storage systems as its own devices. The first storage system or a management server selects a third storage system, which is a collection destination of stopped devices, from the plurality of second storage systems, selects a stopped device of any other second storage system to be migrated for data to the third storage system, migrates the stopped logical device in the other second storage system as a migration source to the third storage system by rearranging devices among storage systems, stops the third storage system under a condition that all logical devices in the third storage system are stopped by repeating the data migration.

That is, according to the present invention, there is provided a computer system in which a host computer, a storage system, and a management server are connected to one another via a network. The storage system receives a request to detach a logical device, specifies a logical device to be processed and a physical device corresponding to the logical device using information included in the request, releases a definition of a host path of the logical device, and stops the physical device.

In accordance with the storage system of the present invention, when a large amount of data is stored for a long time by using a plurality of disk devices, through an instruction to detach a specific logical device from a user or an application program, a disk device corresponding to the relevant logical device is stopped, thus power consumption can be suppressed and system operation cost can be reduced. Further, by stopping the disk device, the life span of the relevant device can be extended and system management cost can be reduced through the reduction in the number of replacements of the device during the long-term storage.

In addition, in accordance with the storage system of the aspect of the present invention, a plurality of logical devices distributed, in which corresponding disk devices are stopped, in a plurality of storage systems are rearranged through a data migration to a specific storage system. Also, at the time when the disk devices of all logical devices in the specific storage system are stopped, the relevant storage system itself is stopped, such that the power consumption can be further suppressed and a system migration cost can be reduced.

BRIEF DESCRIPTION OF THE DRAWINGS

FIG. 3 is a diagram showing an example of logical device management information;

FIG. 4 is a diagram showing an example of LU path management information;

FIG. 5 is a diagram showing an example of physical device management information;

FIG. 6 is a diagram showing an example of external device management information;

FIG. 7 is a diagram showing an example of detached device backup information;

DETAILED DESCRIPTION OF THE PREFERRED EMBODIMENTS

Now, a preferred embodiment for carrying out the present invention will be described.

First, second, and the third embodiments of a computer system, a storage system, and a device control method will be described according to the present invention.

In the first embodiment, there is provided a storage system in which a first storage system having an external storage connection method is connected to one or more second storage systems. According to a request to detach a first logical device of the first storage system from a user or an application program, the storage system releases a definition of an LU path of the relevant logical device, judges, based on control information included in the request, whether or not the relevant logical device needs to be stopped, and, when the relevant logical device needs to be stopped, stops a physical device or a second logical device in the second storage system corresponding to the relevant logical device. At this time, a correspondence between the first logical device and the physical device or the second logical device is maintained.

In the second embodiment, at the time of the detach processing to the first logical device in the first embodiment, when the first logical device corresponds to the second logical device of the second storage system through the external storage connection method, the storage system releases the association between the first and the second logical devices and permits an association of an address of the first logical device with any other logical device in the second storage system. On the other hand, when the first logical device corresponds to the physical device, the storage system performs the same operation as in the first embodiment.

In the third embodiment, according to the request to detach from the user or the application program, the storage system collects one or more stopped second logical devices in the second storage system into a specific second storage system through a device migration among the storage systems, and when all logical device in the second storage system are stopped, stops the second storage system.

First Embodiment

Figure 1:
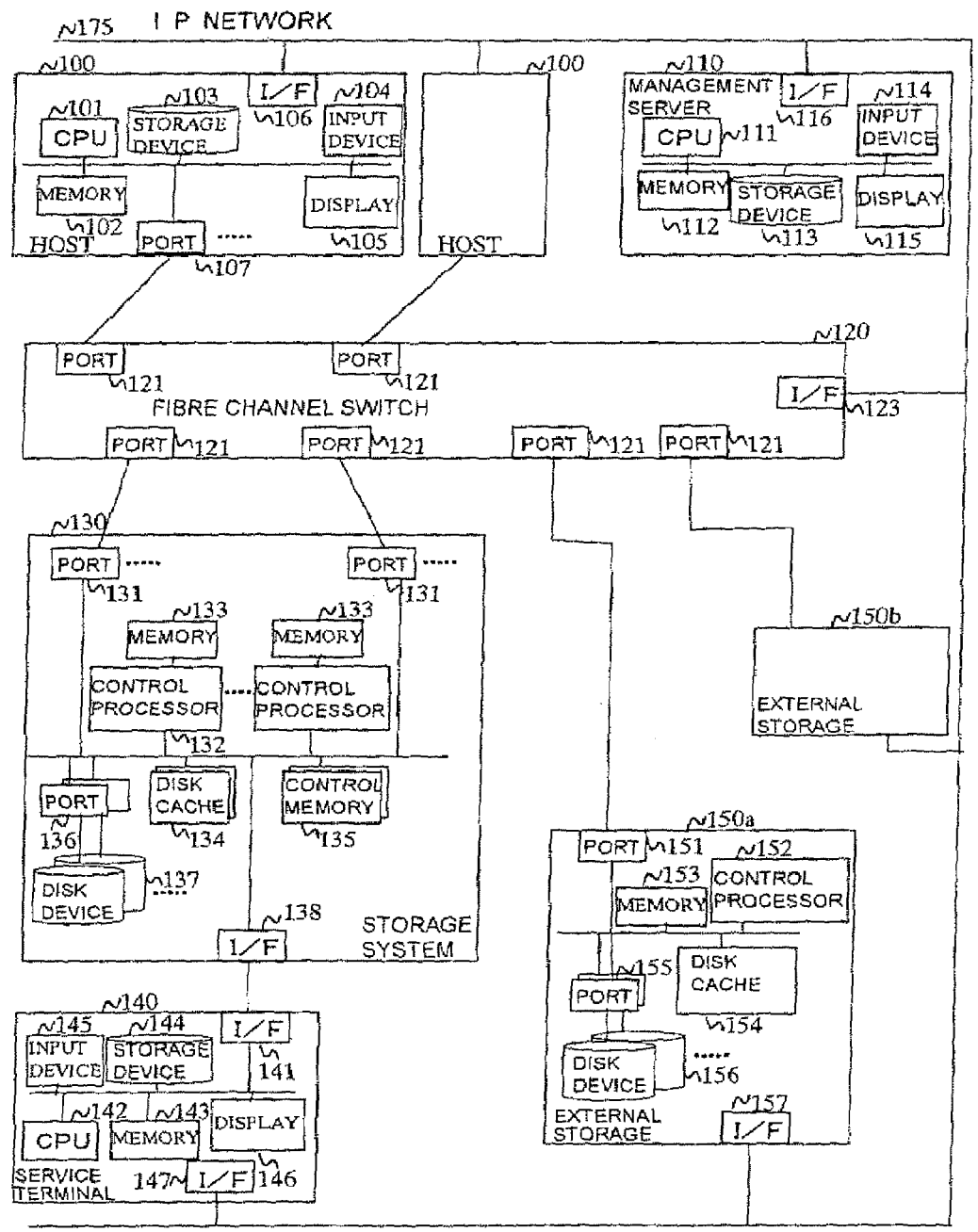
FIG. 1 is a diagram showing an example of a hardware configuration of a computer system to which the present invention is applied.

First, the first embodiment will be described with reference to FIGS. 1 to 6 and FIGS. 8 to 13. FIG. 1 is a diagram showing an example of a hardware configuration of a computer system to which the first embodiment of the present invention is applied.

A computer system has one or more host computers (hereinafter, referred to as a host) 100, a management server 110, a fibre channel switch 120, a storage system 130, a service terminal 140, and external storages 150a and 150b (generically referred to as an external storage 150). The host 100, the storage system 130, and the external storage 150 are connected to ports 121 of the fibre channel switch 120 via ports 107, 131, and 151, respectively. Further, the host 100, the storage system 130, the external storage 150, and the fibre channel switch 120 are connected to the management server 110 from interface control units (I/F) 106, 138, 157, and 123 via an IP network 175 and are collectively managed by storage management software (not shown) to be run on the management server 110. Moreover, in the present embodiment, the storage system 130 is connected to the management server 110 via the service terminal 140, but the storage system 130 may be directly connected to the IP network 175.

The host 100 is a computer having a CPU 101, a memory 102, and the like. Software such as an operating system, an application program, or the like stored in a storage device 103 such as a disk device, a magneto-optical disk, or the like is read to the memory 102, and the CPU 101 reads the software from the memory 102 to execute the software, thus a predetermined function is achieved. Further, the host 100 has an input device 104 such as a keyboard, a mouse, or the like or an output device such as a display 105 or the like. The input/output device 104 receives an input signal from a host administrator or the like and the output device outputs information instructed from the CPU 101. Further, in addition to the ports 107, the host 100 has one or more interface control units 106 for the connection to the IP network 175.

The management server 110 is also a computer having a CPU 111 and a memory 112. Storage management software or the like stored in a storage device 113 such as a disk device, a magneto-optical disk, or the like is read to the memory 112 and the CPU 111 reads and executes the software, and thus a predetermined function such as operation or maintenance of the entire computer system is achieved. If the storage management software is executed by the CPU 111, the management server 110 collects configuration information, resource utilization percentage, performance monitoring information, failure log, and the like from respective devices in the computer system via the interface control unit 116 and the IP network 175. Then, the management server 110 outputs these collected information to the output device such as the display 115 or the like to suggest to a storage administrator. Further, the management server receives an instruction from the storage administrator via the input device 114 such as the keyboard, the mouse, or the like and transmits the received operation or maintenance instruction to the respective devices via the interface control unit 116.

The storage system 130 has a configuration in which one or more ports 131, one or more control processors 132, one or more memories 133 connected to the respective control processors 132, one or more disk caches 134, one or more control memories 135, one or more ports 136, one or more disk devices 137 connected to the respective ports 136, and an interface control unit 138 are connected to one another via an internal network.

The control processor 132 specifies a device to be accessed according to a request for input/output received from the port 131 and processes the request for input/output to the disk device 137 corresponding to the relevant device or a device in the external storage 150. At that time, the control processor 132 specifies the device to be accessed from a port ID and an LUN (Logical Unit Number) included in the received request for input/output. Moreover, in the present embodiment, a port corresponding to a fibre channel interface with SCSI (Small Computer System Interface) as a higher-level protocol is assumed as the port 131. However, ports corresponding to other network interfaces for storage connection such as IP network interfaces or the like with SCSI as the higher-level protocol may be adopted.

The storage system 130 of the present embodiment has the following device hierarchy. First, a disk array is constituted by a plurality of disk devices 137 and is managed as a physical device by the control processors 132. Further, the control processor 132 allocates a logical device to the physical device mounted on the storage system 130. (That is, the control processor 132 associates the physical device with the logical device.) The logical device is managed in the storage system 130 and its number is independently managed in each storage system 130. The logical device is associated with the LUN allocated to each port 131 and is provided to the host 100 as a device of the storage system 130. That is, the host recognizes the logical device of the storage system 130. The host 100 accesses to data stored in the storage system 130 by using the LUN of the port 131 corresponding to the logical device. Moreover, in the present embodiment, the control processor 132 manages a logical device of the external storage 150 as an external device and has an external storage connection method which virtualizes the external device as a device of the storage system 130. In a manner similar to the physical device, the one or more external devices brought into connection using the external storage connection are associated with the logical device of the same storage system 130. Moreover, the external device is also independently managed in each storage system 130. In order to realize such a device hierarchy, the control processor 132 manages the correspondence relationship among the respective devices of the logical device, the physical device, the disk device 137, the external device, and the logical device of the external storage 150, converts a request to access to the logical device into a request to access to the disk device 137 or the logical device of the external storage 150, and performs processing of transmitting the converted request to access to a proper device. Moreover, as described above, the storage system 130 in the present embodiment defines one or a plurality of physical devices by collecting the plurality of disk devices 137 (that is, associates with one or the plurality of physical devices by collecting the plurality of disk devices 137), allocates one logical device to one physical device, and provides the allocated logical device to the host 100. Alternatively, the respective disk devices 137 may be exhibited to the host 100 as one physical device and one logical device.

Further, the control processor 132 executes various processing programs to realize data associations, such as data copy or data rearrangement, in addition to the input/output processing to the device.

Further, the control processor 132 transmits configuration information, which is suggested to the storage administrator, to the service terminal 140 connected thereto via the interface control unit 138 and receives the maintenance or operation instruction, which is inputted from the administrator to the service terminal 140, from the service terminal 140 to perform a configuration change of the storage system 130 or the like.

The disk cache 134 stores data frequently read by the disk device 137 in advance so as to increase the processing speed with respect to the request to access from the host 100 or temporarily stores write data received from the host 100. Moreover, when performing a write-after processing with the disk cache 134, that is, when a reply to a request to write is returned to the host 100 after the write data received from the host 100 is stored in the disk cache 134 and before the write data is actually written into the disk device 137, in order to prevent loss of the write data stored in the disk cache before being written into the disk device 137, it is preferable to enhance availability of the disk cache 134. For example, the disk cache 134 may be made nonvolatile through a battery backup or the like or may be duplexed to enhance the tolerance to medium failure.

The control memory 135 stores control information to manage attributes of the respective devices to implement the above-described device hierarchy or correspondence relationships among the devices or control information to manage disk-reflected or disk-nonreflected data stored on the disk cache 134. If the control information stored in the control memory 135 is lost, it is impossible to access to data stored in the disk device 137. Thus, it is preferable that the control memory 135 has a configuration with high availability. For example, the control memory 135 may be made nonvolatile through a battery backup or the like or may be duplexed to enhance the tolerance to medium failure.

The respective parts in the storage system 130 are as shown in FIG. 1 and are connected to one another via an internal network to transmit and receive data, control information, and configuration information among them. With this internal network, the control processors 132 can share and manage the configuration information of the storage system 130 with one another. Moreover, from a viewpoint of enhancing the availability, the internal network also is preferably duplexed.

The service terminal 140 has a CPU 142, a memory 143, a storage device 144, an interface control unit 141 connected to the storage system 130, an interface control unit 147 connected to the IP network 175, an input device 145 that receives input from the storage administrator, and an output device, such as a display 146, that outputs the configuration information or control information of the storage system 130 to the storage administrator. The CPU 142 reads a storage management program stored in the storage device 144 to the memory 143 and executes the storage management program to perform a configuration information reference, a configuration change instruction, an operation instruction of a specific function, and the like. The CPU 142 serves as the storage administrator or an interface between the management server 110 and the storage system 130, with respect to the maintenance or operation of the storage system 130. Moreover, the storage system 130 may be directly connected to the management server 110 without having the service terminal 140, such that the storage system 130 is managed with management software which is running on the management server 110.

The external storage 150 has one or a plurality of ports 151 connected to the ports 131 of the storage system 130 via the fibre channel switch 120, a control processor 152, a memory 153, a disk cache 154, one or a plurality of disk devices 156, and one or a plurality of ports 155 connected to the respective disk devices. The control processor 152 executes a program stored in the memory 153 and processes a request for input/output received from the port 151 to the disk device 156. In the present embodiment, the external storage 150 has a configuration smaller than the storage system 130, without having the control memory, but it may have the same configuration and scale as those of the storage system 130.

Moreover, in the present embodiment, as shown in FIG. 1, since the port 131 of the storage system 130 is connected to the port 151 of the external storage 150 via the fibre channel switch 120, in order to suppress a direct access to the external storage 150 from the host 100, it is preferable to set a zoning of the fibre channel switch 120. Further, the port 131 and the port 151 may be directly connected to each other without passing through the fibre channel switch 120.

Figure 2:
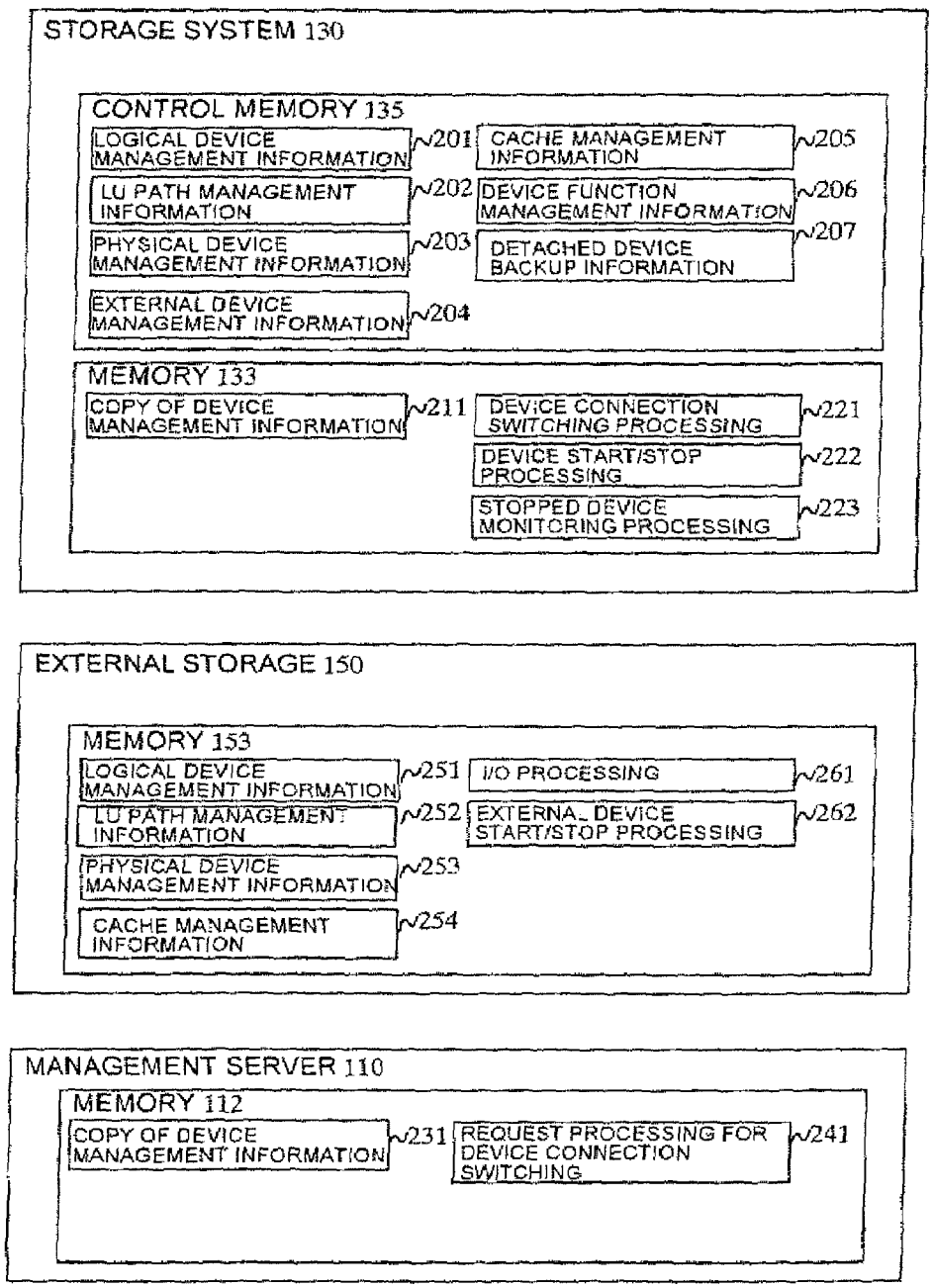
FIG. 2 is a diagram showing an example of a software configuration of a storage system to which the present invention is applied.

Next, a software configuration of the storage system 130 according to the embodiment of the present invention will be described. FIG. 2 is a software configuration diagram showing an example of control information and a program for a storage control processing stored in the control memory and the memory of the storage system 130 and the management server 110.

As configuration management information of the storage system 130, logical device management information 201, LU path management information 202, physical device management information 203, external device management information 204, cache management information 205, and device function management information 206 in the control memory 135 are exemplified. In the present embodiment, the information is stored in the control memory 135 so as to prevent information loss. Moreover, detached device backup information 207 is control information used in a second embodiment and does not need to be stored in the respective memories in the first embodiment. The control information can be referred or updated from the control processor 132. At that time, an access through an interconnection network is required. Thus, in order to enhance processing performance, copies of the control information required for processing executed by the respective control processors 132 are stored in the memories 133. Further, the configuration information of the storage system 130 is also transmitted to and stored in the service terminal 140 or the management server 110. When the configuration of the storage system 130 is changed according to the storage management software from the management server 110 or the service terminal 140 or an instruction from the storage administrator or when the configuration of each part in the storage system 130 is changed due to a failure, an automatic replacement, or the like, one of the control processors 132 updates the relevant configuration information in the control memory 135. Then, the control processor 132 notifies other control processors 132, the service terminal 140, and the management server 110 of the purport that the control information is updated by the change in configuration, via the interconnection network, and inputs the latest information from the control memory 135 to the memories of other parts.

Further, in a manner similar to the storage system 130, the external storage 150 stores logical device management information 251, LU path management information 252, physical device management information 253, and cache management information 254 for device management of the logical devices or physical devices therein or data management. The contents thereof are used for the same purpose as those of the storage system 130.

In addition, the management server 110 stores the copy of the device management information collected from the storage system 130 or the external storage 150 or storage management information 232 indicating the attribute of each storage system in the memory 112. In order to avoid the data loss, the information may be stored in the storage device 113 mounted on the management server 110.

Next, the information will be described respectively. First, the logical device management information 201 will be described. FIG. 3 shows an example of the logical device management information 201. The logical device management information 201 stores a group of information from a logical device number 301 to a connected host name 308 with respect to the respective logical devices.

In the logical device number 301, a number allocated by the control processor 132 to a logical device is stored so as to identify the logical devices. In a size 302, a capacity of the logical device specified by the logical device number 301 is stored.

In a corresponding physical/external device number 303, a number of a physical device or an external device associated with the relevant logical device, that is, an entry number of the physical device management information 203 or the external device management information 204 as the management information of the physical device or the external device is stored. In the present embodiment, the logical device and the physical/external device correspond to each other one by one. Alternatively, when one logical device is made by combining a plurality of physical/external devices, the logical device management information 201 needs to have an entry for storing a number list of the physical/external devices, to which the respective logical devices correspond, and the number of the physical/external devices. Moreover, when the logical device is not defined, the corresponding physical/external device number 303 is set to be an invalid value. In a type 304, a device type identifier of the relevant logical device is stored. The storage system 130 can define different types of a plurality of logical devices, such as a data management unit on the cache or a recording form of the device management information (presence/absence of the disk space for storing the management information or the recording form of the information) and store a device type of each logical device in the type 304.

In a device status 305, information indicating the status of the relevant logical device is set. As a status, 'attached', 'detached', 'unmounted', 'blocked' are exemplified. The 'attached' indicates that the relevant logical device is normally operated, an LU path is defined in one or more ports 131, and the logical device is in a state where the host 100 can access. The 'detached' indicates that, while the relevant logical device is defined and is normally operated, it is not in the state where the host 100 can access because the LU path is not defined, or the like. The 'unmounted' indicates that the relevant logical device is not defined with respect to a physical device or an external device and is not in the state where the host 100 can access. The 'blocked' indicates that the relevant logical device is not in the state where the host 100 can access due to a failure of the relevant logical device. The device status 305 has an initial value of 'unmounted', and changes to 'detached' through a logical device definition processing and, in turn, to 'attached' through an LU path definition processing.

In a stop flag 306, information indicating a start/stop status of the relevant logical device is set. That is, when a request to detach or a request to stop accompanied with the stop of the relevant logical device is received from a user or an application program and when the request is processed by the storage system 130, 'Off' indicating a stop status is stored in the above-described entry. Further, when the relevant logical device is started, 'On' indicating a start status is stored.

In a port number of the entry 307, information indicating whether or not the relevant logical device is under the LUN definition to which port from the plurality of ports 131, that is, an identifier of a port 131 used to access the relevant logical device is set. Here, the identifier of the port 131 is a unique number in the storage system 130, which is allocated to each port 131. Further, a target ID and an LUN stored in the same entry 307 are identifiers for identifying the relevant logical device. In the present embodiment, as identifiers for identifying the logical device, a SCSI-ID and the LUN, which are used when the host 100 accesses the device under a SCSI environment, are used. In the entry 307, information is set when the LU path definition is executed with respect to the relevant logical device.

A connected host name 308 is a host name to identify the host 100 which is permitted to access the relevant logical device. As the host name, a value, such as a WWN (World Wide Name) attached to the port 107 of the host 100, may be used, as long as the host 100 and the port 107 can be uniquely identified. In the same storage system 130, additionally, management information regarding an attribute of a port, such as a WWN of each port 131, is stored. The entry 308 is set when the logical device is defined by the storage administrator.

Secondly, the LU path management information 202 will be described. FIG. 4 shows an example of the LU path management information 202. The LU path management information 202 stores information for a valid LUN defined to each port with respect to the respective ports 131 in the storage system 130. In the entry of a target ID/LUN 402, the LUN defined (allocated) to the port 131 is stored. In the corresponding logical device number 403, the number of a logical device to which the relevant LUN is allocated is stored. A connected host name 404 stores information indicating the host 100 which is permitted to access the relevant LUN defined to the relevant port 131. As the information indicating the host 100, for example, the above-described WWN attached to the port 107 of the host 100 is used.

Moreover, there is a case in which the LUNs of the plurality of ports 131 are defined (allocated) to one logical device and the relevant logical device can be accessed from the plurality of ports 131. In this case, the union of the connected host names 404 of the LU path management information 202 regarding the respective LUNs of the plurality of ports 131 is stored in the connected host name 308 of the logical device management information 201 regarding the relevant logical device.

Thirdly, the physical device management information 203 will be described. The physical device management information 203 is used for the management of the physical device constituted by one or more disk devices 137 in the storage system 130. FIG. 5 shows an example of the physical device management information 203. Each storage system 130 stores a group of information from a physical device number 501 to a size/offset 509 for each physical device therein.

In the physical device number 501, an identification number for identifying a physical device is registered. In a size 502, a capacity of the physical device specified by the physical device number 501 is stored. In a corresponding logical device number 503, a number of a logical device with which the relevant physical device is associated is stored at a moment when the relevant logical device is defined. When the relevant physical device is not allocated to a logical device, the entry 503 is set to be an invalid value.

In a device status 504, information indicating a status of the relevant physical device is set. As the status, 'attached', 'detached', 'unmounted', and 'blocked' are exemplified. The 'attached' indicates that the relevant physical device is normally operated and the physical device is allocated to the logical device. The 'detached' indicates that, while the relevant physical device is defined and is normally operated, it is not allocated to the logical device. The 'unmounted' indicates that a physical device to the relevant physical device number is not defined on the disk device 137. The 'blocked' indicates that the relevant physical device is not in a state where it can be accessed due to a failure of the relevant physical device. The device status 504 has an initial value of 'unmounted', and changes to 'detached' through a physical device definition processing and, in turn, to 'attached' at a moment at which the logical device is defined.

In a stop flag 505, information indicating a start/stop status of the relevant physical device is set. That is, when a request to detach or a request to stop accompanied with the stop of the logical device corresponding to the relevant physical device is received from a user or an application program, when the relevant logical device having received the request is stopped, and when all logical devices corresponding to the relevant physical device are stopped, the disk device 137 corresponding to the relevant physical device is stopped and, at the same time, 'Off' indicating that the relevant physical device is stopped is stored in the entry. Further, when the relevant physical device is started, 'On' indicating a start status is stored.

In a last stop time 506, information indicating a date and time that the relevant physical device is stopped, that is, the stop flag 505 changes to 'Off'. By using the entry 506 and the current time, the lapsed time after the relevant physical device is stopped can be calculated.

In a RAID configuration 507, information regarding the RAID configuration, such as a RAID level, a data disk, the number of parity disks, a size of a stripe as a unit for data division, and the like, of the disk device 137 to which the relevant physical device is allocated is stored. In a disk number list 508, an identification number of each of the plurality of disk devices 137 constituting the RAID to which the relevant physical device is allocated is stored. The identification number of the disk device 137 is a unique value attached to identify the disk device 137 in the storage system 130. The size/offset in disk 509 is information indicating to which area the relevant physical device is allocated in each disk device 137. In the present embodiment, for simplicity, with respect to all physical devices, the offset and size in each of the disk devices 137 constituting the RAID are the same.

Fourthly, the external device management information 204 will be described. The external device management information 204 is used to manage a logical device of the external storage 150 connected to the storage system 130 as an external device. FIG. 6 shows an example of the external device management information 204. The storage system 130 stores a group of information from an external device number 601 to a target port ID/target ID/LUN list 610 for each logical device (external device) in the external storage 150. In the external device number 601, a unique value in the storage system 130, which is allocated to the relevant external device by the control processor 132 of the storage system 130, is stored. In a size 602, a capacity of the external device specified by the external device number 601 is stored. In a corresponding logical device number 603, the number of a logical device in the storage system 130 associated with the relevant external device is registered.

In a device status 604, a stop flag 605, and a last stop time 606, in a manner similar to the device status 504, the stop flag 505, and the last stop time 506 of the physical device management information 203, the respective statuses of the relevant external device are set. Moreover, since the storage system 130 is not connected to the external storage 150 in an initial state, an initial value of the device status 604 is set to 'unmounted'.

In a storage identifier 607, an identifier of the external storage 150 on which the relevant external device is mounted is stored. As the storage identifier, a combination of a manufacturer identifier of the same storage system and a manufacture serial number uniquely allocated by a manufacturer or the like can be considered. In a device number in the external storage 608, an identification number allocated in the external storage 150 to a logical device of the external storage 150 corresponding to the relevant external device, that is, a logical device number is stored.

In an initiator port number list 609, an identification number of the port 131 of the storage system 130 which is accessible to the relevant external device is registered. When the relevant external device can be accessed from the plurality of ports 131, a plurality of port identification numbers are registered.

In the target port ID/target ID/LUN list 610, when the external device is under the LUN definition in one or more ports 151 of the external storage 150, one or a plurality of port IDs of the ports 151 and the target IDs/LUNs to which the relevant external device is allocated are stored. Moreover, when the control processor 132 of the storage system 130 accesses to the external device (when the control processor 132 transmits the request for input/output from the port 131 to the external device), the target ID and the LUN allocated to the relevant external device by the external storage 150 to which the relevant external device belongs are used as the information to identify the relevant external device.

Fifthly, the device function management information 206 will be described. In the present information, information regarding various attributes set to the respective logical devices is stored. As an example of the attribute information of the device, access management information which limits an access to the relevant logical device only from a specific host, access attribute information which suppresses a read or write access to the relevant logical device, encryption information, such as presence/absence of encryption application to data in the relevant logical device, key information used in encryption or complexification, or the like, and the like are exemplified.

In the present embodiment, the storage system 130 manages the devices by using the above-described five device management information. As an initial state of the storage system 130, it is assumed that the storage system has the physical device defined to each disk device 137 in advance when shipping. When introducing the storage system 130, a user or a storage administrator defines the logical device of the external storage 150 connected to the same storage system 130 as the external device, defines the logical device on the physical device and the external device, and defines the LUN to each port 131 for each logical device.

Next, returning to FIG. 2, among the programs stored in the memories 133, 153, and 112 of the storage system 130, the external storage 150, and the management server 110, one related to the present invention will be described. In each memory, in addition to the above-described copy of the control information, a program operated by the control processor or the CPU of each part is stored.

In the present embodiment, an attach/detach processing accompanied with the start/stop of a logical device and a processing of periodically monitoring a stopped device will be described. These processings are executed by the management server 110, the storage system 130, and the external storage 150 in cooperation with one another according to a request from the user or the application.

First, in response to the attach/detach processing of the logical device, a device connection switching request processing 241 is stored in the memory 112 of the management server 110, a device connection switching processing 221 and a device start/stop processing 222 are stored in the memory 133 of the storage system 130, and an external device start/stop processing 262 is stored in the memory 153 of the external storage 150. In the external storage 150, an I/O processing 261 is also stored in consideration of suppression of the access to the stopped logical device of the corresponding physical device.

Further, in response to a stopped device monitoring processing, a stopped device monitoring processing 223 is stored in the storage system 130.

Figure 8:
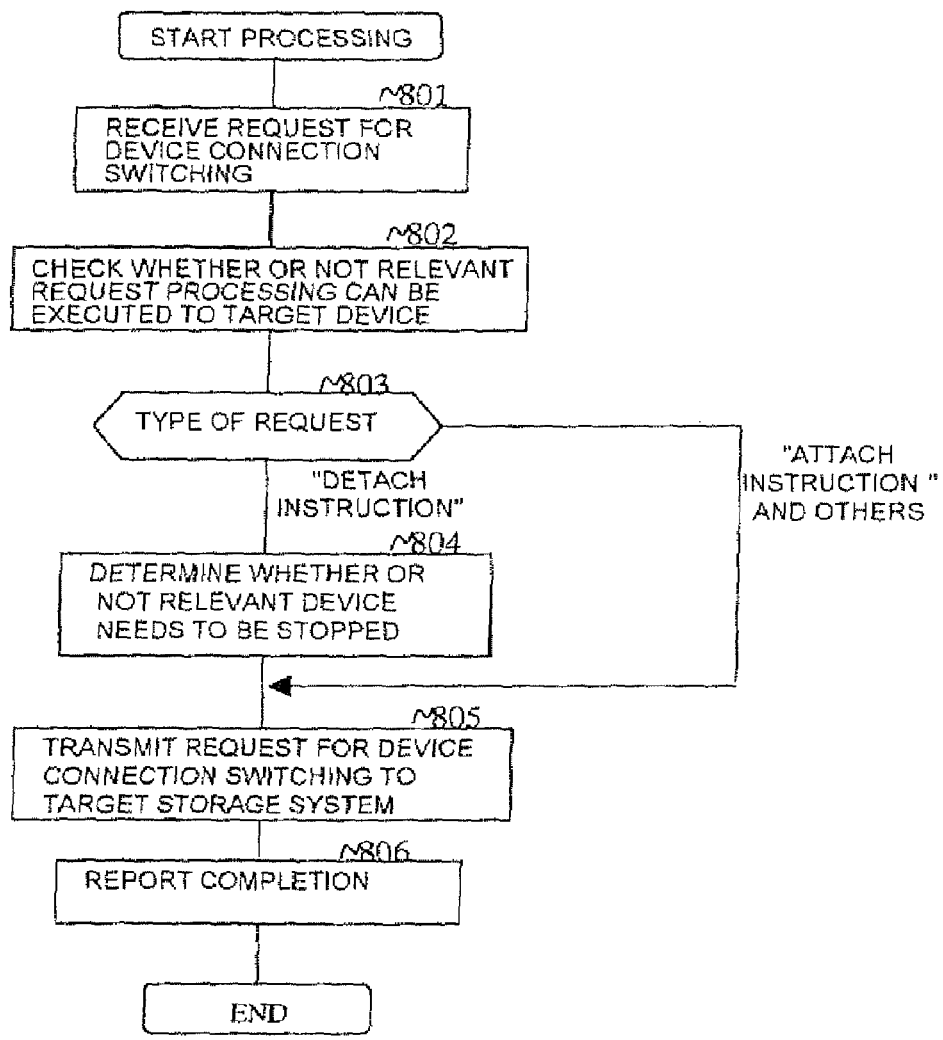
FIG. 8 is a diagram showing an example of a flow of a request processing for device connection switching 241 which is executed by a management server 110.

FIG. 8 is a diagram showing an example of a flow of the device connection switching request processing 241 which is executed by the management server 110. The management server 110 receives a request to attach or detach to a logical device of the storage system 130 from the user or the application program via the IP network 175 and the interface control unit 116 (Step 801). As information included in the request, for example, a content of connection switching (detach/attach), device stop judgment information, access source HBA specification information (WWN or the like), port specification information (the port ID of the port 131, the target ID, the LUN list, and the like), target device specification information (the identifier of the storage system 130, the logical device number), and the like can be considered. The management server 110 confirms whether or not the request is received from a user or an application program on the host 100 having access permission from the access authority set to the relevant logical device or the like and judges whether or not the request can be executed (Step 802). If the request can be executed, when the request content is 'detach of the relevant logical device', the management server 110 judges whether or not the relevant logical device needs to be stopped from the device stop judgment information or the like of the request (Steps 803 and 804).

At this time, as the device stop judgment information, a flag indicating whether or not the logical device needs to be stopped may be provided during the request to detach. Alternatively, an expected time to detach the device may be set, and the device stop judgment information may be obtained when the time is longer than a prescribed value. Further, a detach time may be set, instead of the expected time, and, according to the detach time, whether or not the device needs to be stopped can be judged and a control such as an automatic attach when the time is expired, or the like can be performed. Further, information indicating an expected access frequency to a logical device to be detached may be set and a device having low access frequency may be stopped. For example, an attribute of 'WORF (Write Once Read Few)' is set in advance for a device stored data, such as mail archive data stored for a long time as a countermeasure for an inspection, 'which is written once and is not referred to until the inspection'. Then, when the device set with the WORF attribute is instructed to be detached, irregardless of the user assignment, the logical device may be stopped. Further, without judging whether or not the logical device needs to be stopped, when the logical device is assigned to be detached, the logical device may be stopped unconditionally. However, as for the disk device 137, generally, an upper limit for the number of stop operations is determined, and the stop operations exceeding the upper limit cause a failure. Thus, it is preferable to manage the number of stop operations for each disk device 137 and suppress stop operations with high frequency. Moreover, the management of the number of stop operations may be performed by the storage system.

Next, the management server 110 transmits the request to attach or detach the relevant logical device to the storage system 130 (Step 805) and, after reporting from the storage system 130 that the processing is completed, reports the processing completion to the user or the application program (Step 806).

Figure 9:
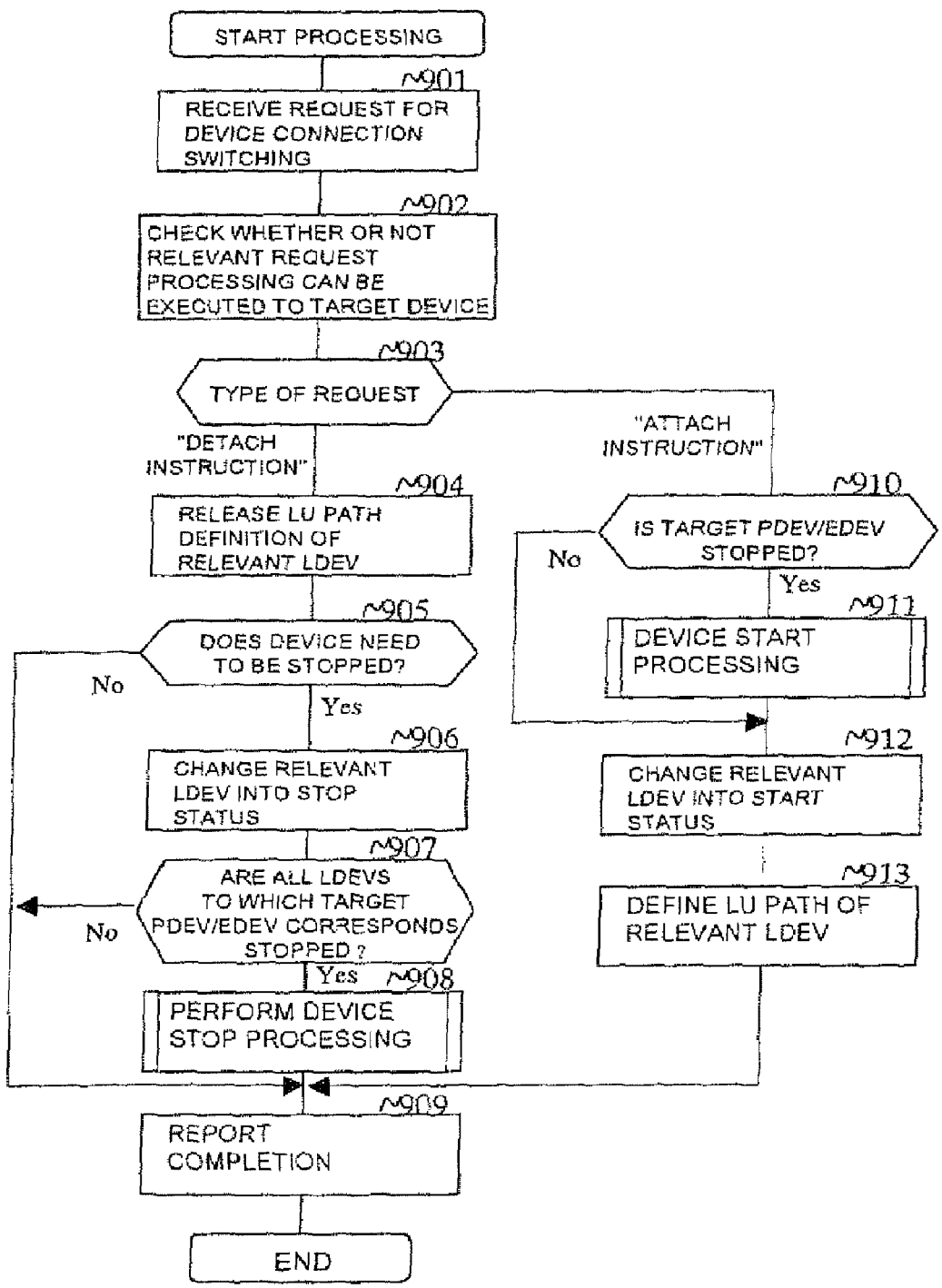
FIG. 9 is a diagram showing an example of a flow of a device connection switching processing 221, which is executed by a storage system 130, in embodiment 1.

FIG. 9 is a diagram showing a flow of the device connection switching processing 221 which is executed by the storage system 130. The storage system 130 receives a connection switching request of a logical device from the management server 110 via the IP network 175, the service terminal 140, the interface control unit 138 (Step 901). Information included in the request is substantially the same as that in the switching request received by the management server 110 in the Step 801, except that a device stop flag which is the judgment result in the management server 110 is included, instead of the device stop judgment information. Next, the storage system 130 judges whether or not the request can be executed according to the access authority to the logical device or the like (Step 902). When the request cannot be executed, the purport is notified to the management server 110 and the processing ends. If the request can be executed, when the request content is a detach instruction, first, the LU path definition set to the logical device is released (Steps 903 and 904). Specifically, the content of the entry 307 of the logical device field of the logical device management information 201 is eliminated, the device status 305 is changed to the detached status, and the contents of the entries 403 and 404 of the fields of the port, the target ID, and the LUN corresponding to the logical device of the LU path management information 202 are eliminated. Then, when the stop of the logical device is not instructed by the switching request from the management server 110, the processing completion is reported to the management server 110 and the processing ends (Step 909). When the stop of the logical device is instructed, the stop flag 306 of the logical device management information 201 is set to 'Off' (Step 906). As for the physical device or the external device corresponding to the logical device, when all logical devices to which the physical/external device corresponds are stopped, that is, when the stop flag 306 is set to 'Off', the physical/external device is stopped by the device start/stop processing 222 (Step 908). After the stop processing is completed, the completion is reported to the management server 110 and the processing ends (Step 909). On the other hand, with the judgment of the step 903, when the request content from the management server 110 is an attach instruction, first, the physical device or the external device corresponding to the logical device is specified, and when the physical/external device is stopped with reference to the physical device management information 203/the external device management information 204, the physical/external device is started by the device start/stop processing 222 (Steps 910 and 911). After the start processing is completed, the logical device is changed to the start status, that is, the stop flag 306 of the logical device management information 201 is set to 'On' (Step 912) and the LU path is defined (Step 913). As for the LU path definition processing, specifically, port setting information assigned by the switching request is set in the entry 307 of the field of the logical device of the logical device management information 201, the device status 305 is changed to an attached status, and, in the entries 403 and 404 of the fields of the target port, the target ID, and the LUN of the LU path management information 202, the logical device number and the access source HBA identifier are set, respectively.

Figure 10:
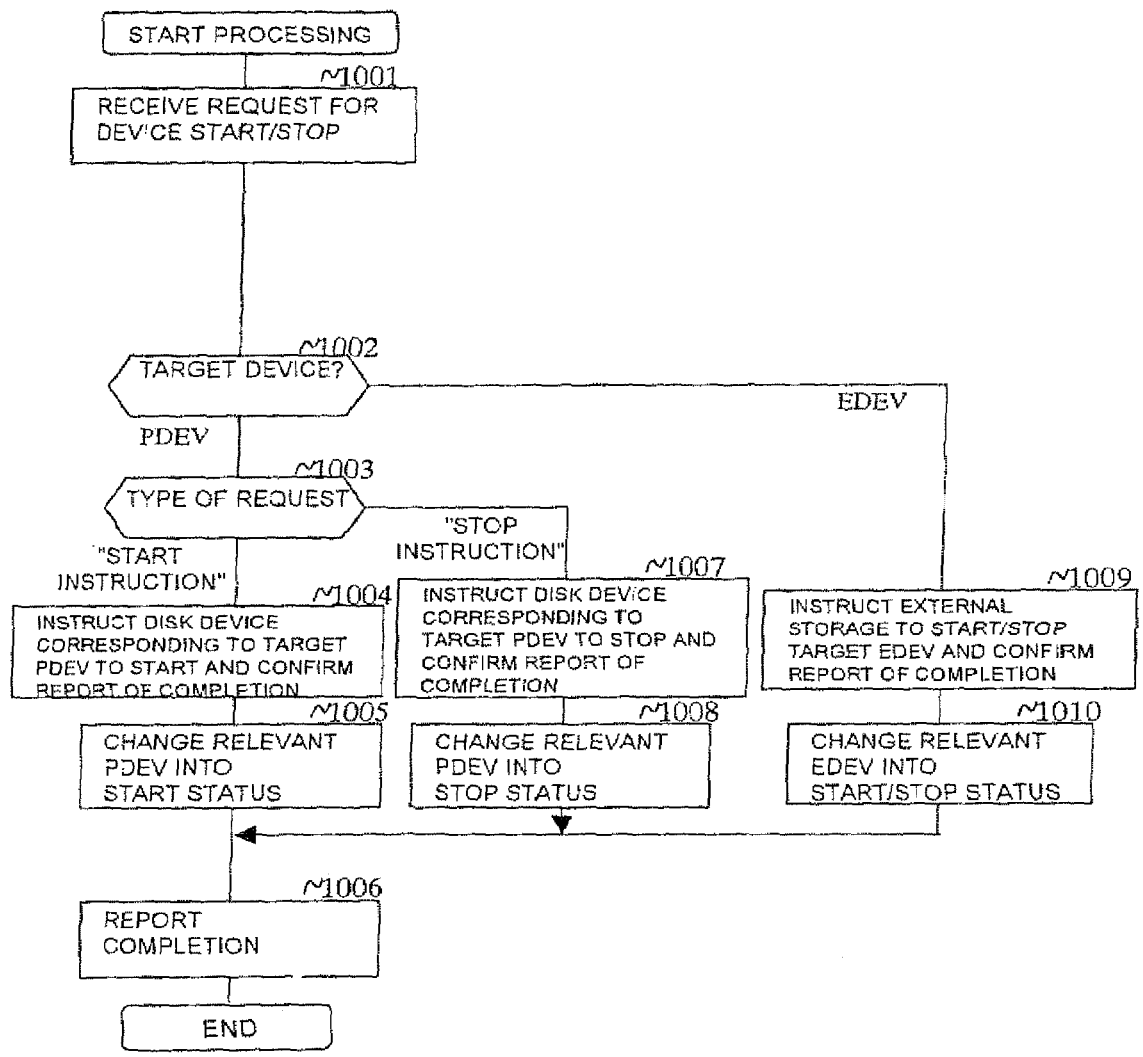
FIG. 10 is a diagram showing an example of a flow of a device start/stop processing 222 which is executed by the storage system 130.

FIG. 10 is a diagram showing an example of a flow of the device start/stop processing 222 which is executed by the storage system 130. The storage system 130 receives the start/stop request of the logical device from the device connection switching processing 221 (Step 1001). As information included in the request, a request content identifier (start/stop), a target device specification information (the physical device number or the external device number), and the like can be considered. Next, the storage system 130 judges whether a target to be processed of the received request is the physical device or the external device (Step 1002). When the target to be processed is the start request of the physical device, the disk device 137 corresponding to the target physical device is started and the physical device is changed to the start status (Steps 1003, 1004, and 1005). Specifically, the control processor 132 transmits a command to instruct the start of a disk rotation to the disk device 137, and a controller in the disk device 137 starts the rotation of the disk according to the command. Thereafter, the completion of the processing is reported to the control processor 132 and the control processor 132 confirms the processing completion report from the disk device 137 and changes the input/output to the disk device 137 to an executable state. Then, the stop flag 505 of the corresponding physical device management information 203 is set to 'On'. Further, when the target to be processed is the stop request of the physical device, the disk device 137 corresponding to the target physical device is stopped and the physical device is changed to the stop status (Steps 1007 and 1008). Specifically, the control processor 132 transmits a command to instruct the stop of a disk rotation to the disk device 137, and a controller in the disk device 137 stops the rotation of the disk according to the command. Thereafter, the completion of the processing is reported to the control processor 132 and the control processor 132 confirms the processing completion report from the disk device 137. Then, the stop flag 505 of the physical device management information 203 is set to 'Off' and the last stop time 506 is set to the stop processing execution time, respectively. On the other hand, when the target to be processed is the external device, a command of the start/stop instruction of the external device to the corresponding external storage 150 is transmitted (Step 1009). The storage system 130 receives the processing completion report from the external storage 150 and updates the external device management information 205 to update the start/stop status of the external device (Step 1010). Moreover, as the command of the start/stop instruction of the disk rotation to the disk device 137, "START STOP UNIT" commands of the SCSI protocol are exemplified.

Figure 11:
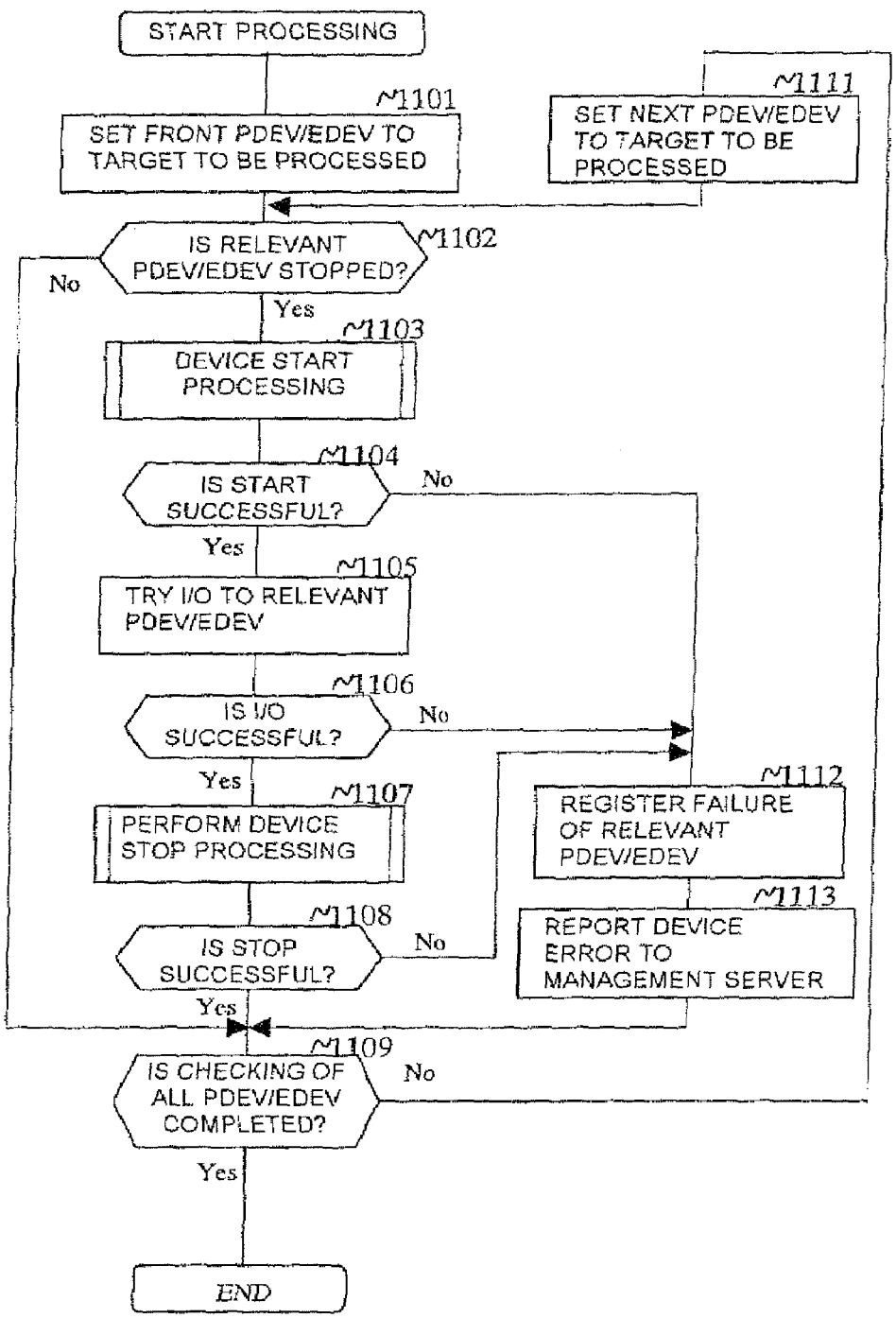
FIG. 11 is a diagram showing an example of a flow of a stopped device monitoring processing 223 which is executed by the storage system 130.

FIG. 11 is a diagram showing an example of a flow of the stopped device monitoring processing 223 which is executed by the storage system 130. First, the stop flags 505/605 of all the devices from the front of the physical/external devices are referred to and the devices having 'Off' are set to the target to be processed (Step 1102). As for the target physical/external device, first, the device is started, the operation is confirmed through a test I/O, and the device is stopped again. At this time, when an error such as a device start/stop failure occurs, the device is registered in a blocked status and an error report on the device is transmitted to the management server (Steps 1103 to 1108, 1112, and 1113). Here, the test I/O may be diagnostic command transmission such as a sense information reference, a read access to user data itself, and a read/write access to a blank disk or a blank area in a device. As for all physical/external devices, the Steps 1102 to 1109 and Steps 1111 to 1113 are repeatedly performed. After the steps are completed for all physical/external devices, the processing ends.

Figure 12:
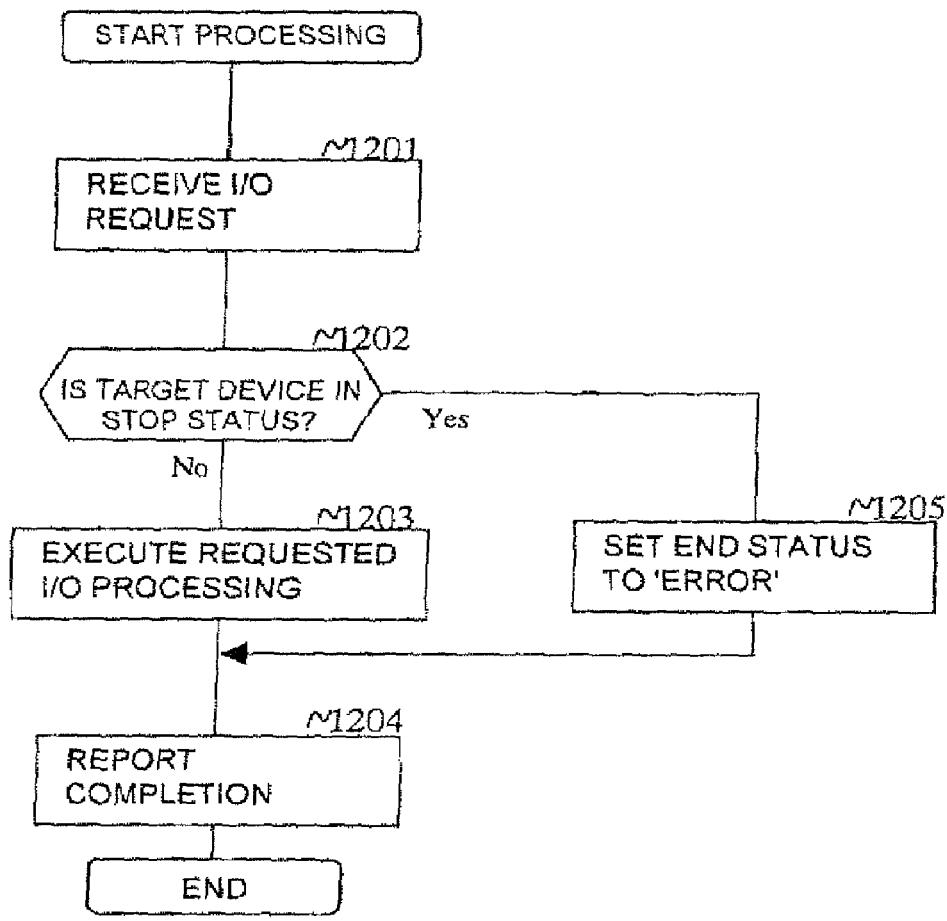
FIG. 12 is a diagram showing an example of a flow of an I/O processing 261 which is executed by an external device 150.

FIG. 12 is a diagram showing an example of a flow of an I/O processing 261 which is executed by the external storage 150. In the first embodiment, the logical device of the external storage 150 which is managed as the external device by the storage system 130 stops the corresponding physical device while maintaining the LU path definition of the port 151. The request for input/output from the storage system 130 to the external device is to be principally suppressed, but, for safety, the external storage also judges whether or not the logical device to be subjected to the I/O processing is stopped, and when the logical device is stopped, reports an error to the storage system 130 so as to display a nonexcutable processing (Steps 1201 to 1204). Moreover, without reporting the error, it may be reported that the device is busy.

Figure 13:
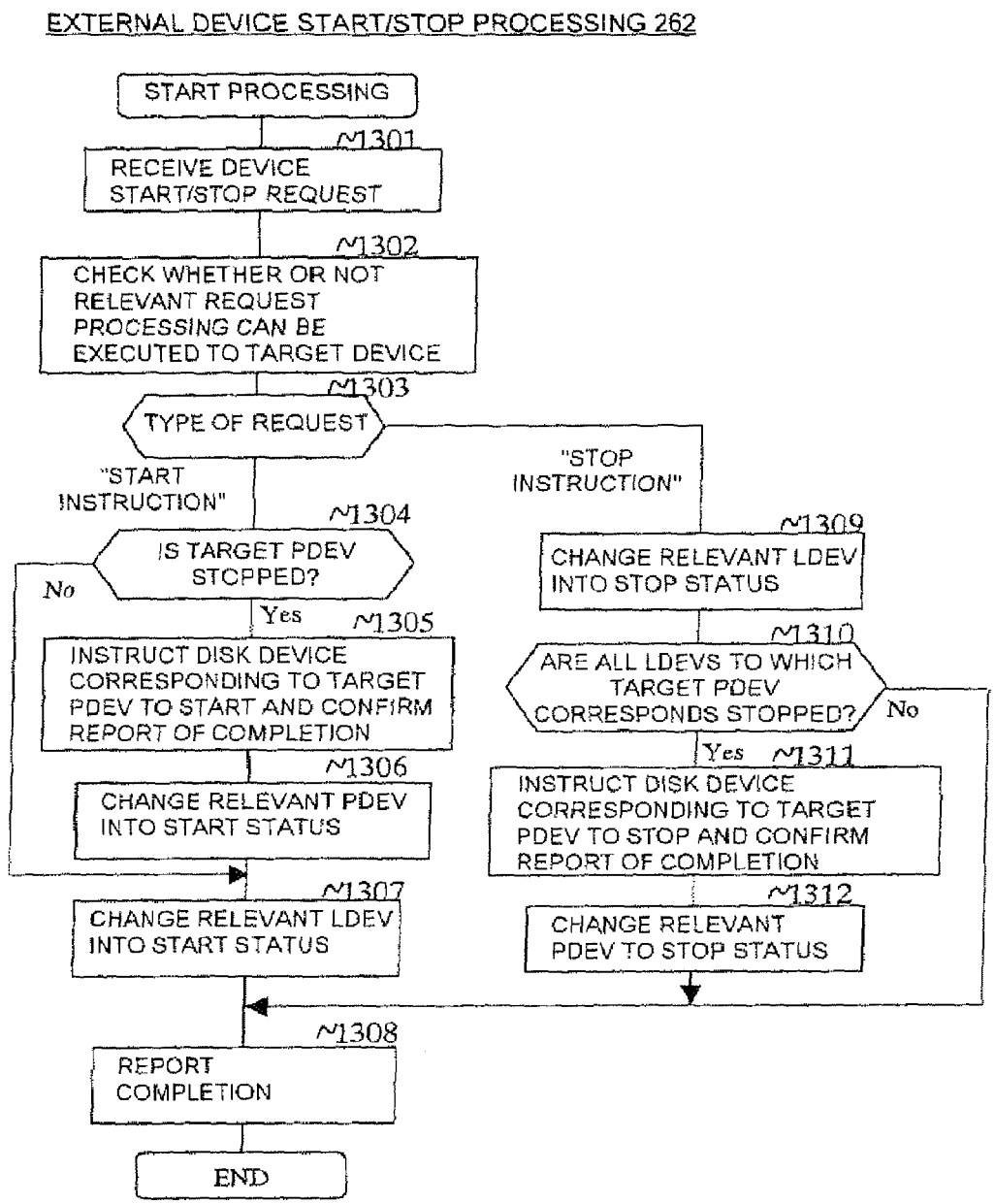
FIG. 13 is a diagram showing an example of a flow of an external device start/stop processing 262 which is executed by the external device 150.

FIG. 13 is a diagram showing an example of a flow of the external device start/stop processing 262 which is executed by the external storage 150. The external storage 150 receives a start/stop request command with respect to the logical device in the external storage 150 corresponding to the external device from the storage system 130 via the fibre channel switch 120 and the port 151 (Step 1301). As information included in the request, a request content identifier (start/stop), target device specification information (an identifier of the external storage system 150 and a logical device number), an identifier of a request source storage system 130 (the WWN of the port 131 or the like), and the like can be considered. In the present embodiment, the request is transmitted according to the SCSI protocol. As the transmission method, parameters of the diagnostic command of the SCSI may be expanded or a dedicated SCSI command transmitting only between the external storage 150 and the storage system 130 may be added to be used. Further, a specific logical device in the external storage 150 may be defined for transmission and reception of a control command and data may be communicated between both storage systems through the read and write operations to the device for transmission and reception of the control command. The external storage 150 judges whether or not the logical device to be requested can execute the request processing, and when the logical device cannot execute the request processing, reports the status to the storage system 130 (Step 1302). Next, in the case of start instruction of the logical device, it is confirmed whether or not the corresponding physical device is stopped, and when the physical device is stopped, the disk device 156 corresponding to the relevant physical device is started and the relevant physical device is changed to the start status. Then, the relevant logical device is changed to the start status (Steps 1304 to 1307). Here, the start of the disk device 156 is implemented by transmitting the command of start instruction of the disk rotation and by confirming the completion report from the disk device 156 which starts the disk rotation. On the other hand, when the request content is the stop instruction of the relevant logical device, first, the relevant logical device is stopped, and as regards the corresponding physical device, when all logical devices corresponding to the physical device are stopped, the disk device 156 corresponding to the relevant physical device is stopped and the relevant physical device is changed to the stop status (Steps 1309 to 1312). Here, the stopping of the physical device 156 is implemented by transmitting the command of stop instruction of the disk rotation and by confirming the completion report from the disk device 156 which stops the disk rotation. Thereafter, the external storage 150 reports the processing completion to the storage system 130 (Step 1308).

Second Embodiment

Next, the second embodiment will be described with reference to FIGS. 1 to 8 and FIGS. 10 to 14. The first and the second embodiments have many common features and only the difference between the two will be described.

In the second embodiment, when the logical device is detached, if the logical device corresponds to the external device, the correspondence relationship between the logical device and the external device is also released, along with the release of the LU path definition. As such, since one logical device number can be used to perform an input/output control of other external devices, a number of external devices exceeding the control limit of the control processor of the storage system 130, such as the upper limit of the logical device number, can be handled.

In the second embodiment, the software configuration is shown in FIG. 2, in a manner similar to the first embodiment. A greater part of the software configuration is the same as that of the first embodiment. However, in the second embodiment, detached device backup information 207 is added to the configuration management information of the storage system 130. In the second embodiment, with the addition of the information, the correspondence between the logical device and the external device is separated when the logical device is detached. That is, since the correspondence between the logical device to be seemingly accessed from the user and the external device which actually stores data is separated dynamically, the function setting of a device needs to be maintained on a basis of the external device, and not the logical device.

FIG. 7 shows an example of a configuration of the detached device backup information 207. The detached device backup information 207 stores the copy 702 of the logical device management information and the copy of the device function management information for each external device. The information is the copy of the corresponding field of each of the logical device management information 201 and the device function management information 206 of the logical device to which the external device corresponds before being detached. When the logical device corresponding to the external device is detached, the copied information is stored in the relevant area. When the logical device is detached, the storage system 130 can take over the information, such as the function setting of the target logical device or the like, by using the information stored in the detached device backup information 207.

Further, in the second embodiment, the external device which is detached and of which the corresponding relationship to the logical device is released needs to be recognized or managed from the user or the application program as the external device, not as the logical device. Accordingly, to request to attach the device, the user or the application program sends the external device number, adding the identifier of the storage system 130 and the logical device number, to the request processing for device connection switching 241 of the management server 110 as target device specification information. Here, the logical device number is the number of the logical device which will be associated with the relevant external device. Similarly, for the processing request to attach the device from the management server 110 to the storage system 130, the external device number is attached as the target device identifier.

Figure 14:
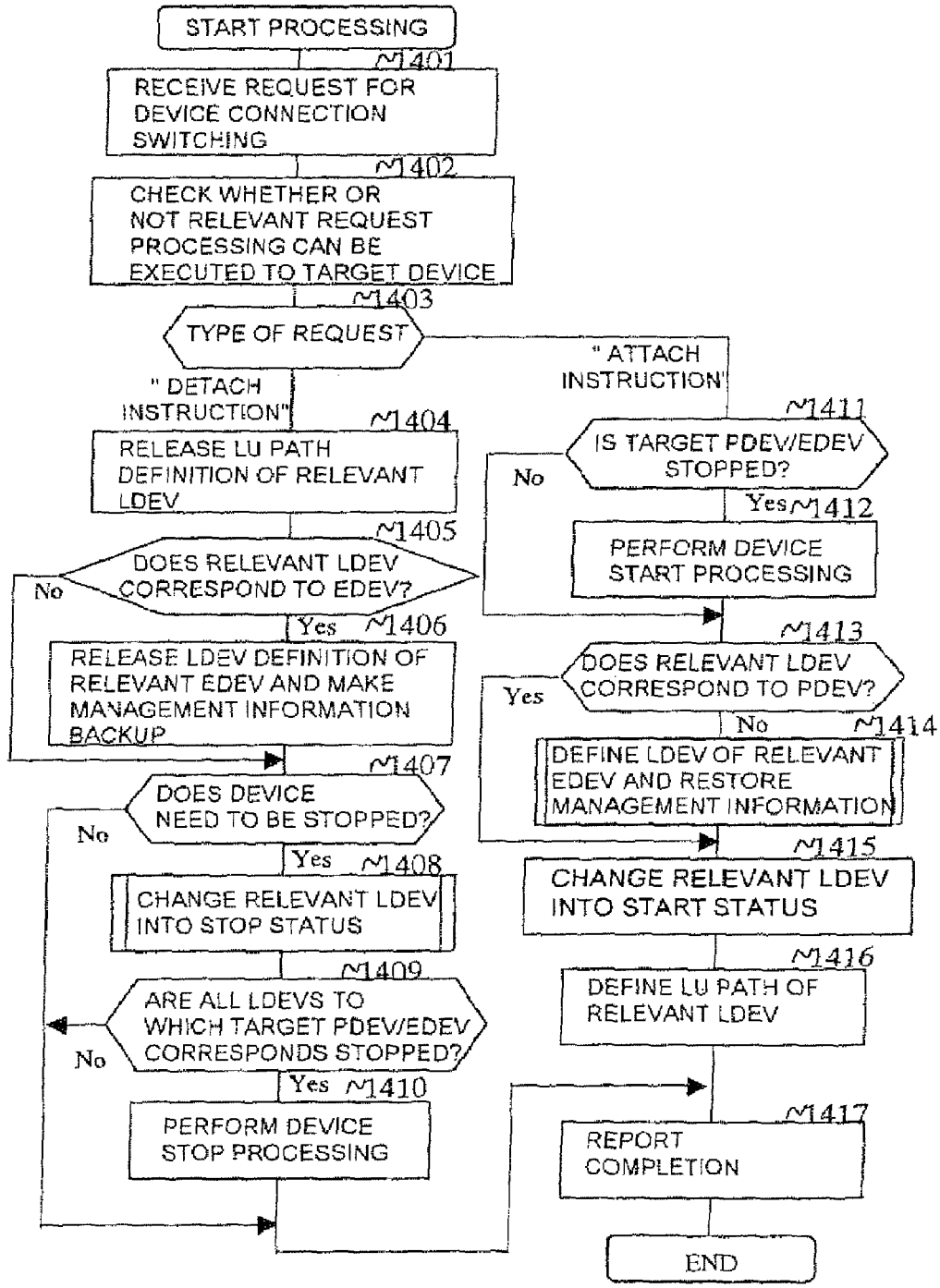
FIG. 14 is a diagram showing an example of a flow of a device connection switching processing 221, which is executed by a storage system 130, in a second embodiment.

FIG. 14 shows an example of a flow of the device connection switching processing 221 which is executed by the storage system 130 in the second embodiment. First, as the flow of the processing, a processing similar to the device connection switching processing 221 of the first embodiment in FIG. 9 is applied. Additionally, in the second embodiment, it is judged whether the target logical device for the detach/attach processing corresponds (or was corresponding) to either the physical device or the external device (Steps 1405 and 1413). Further, when the logical device corresponds (or was corresponding) to the external device, an association release or setting processing between the logical device and the external device and a backup or restoration processing of the management information associated with the logical device (Steps 1406 and 1414) are added. Specific contents of the Steps 1406 and 1414 are as follows. First, in the Step 1406, the storage system 130 backs up the contents of the fields of the logical device of the logical device management information 201 and the device function management information 206 into fields of the external device of the detached device backup information 207 and clears all contents of the logical device management information 201 and the device function management information 206. Then, the device status 305 of the logical device management information 201 is set to 'unmounted', the device status 604 of the external device management information 204 is set to the detached status, and the corresponding logical device number 603 is set to be an invalid value. On the contrary, in the step 1414 of the device/attach processing, the storage system 130 restores the size 302 to the type 304 of the logical device management information 201 and all contents of the device function management information 206 by using the detached device backup information 207 corresponding to the external device. Moreover, the contents from the device status 305 of the logical device management information 201 are the same as those in the first embodiment and set after the Step 1415.

Third Embodiment

In the first and second embodiments, the physical/external device corresponding to the logical device assigned from the user or the application program is detached and the corresponding disk device is stopped. The correspondence between the logical device and the physical/external device can be arbitrarily defined according to the setting of the storage administrator, and thus the stopped external devices are distributed and exist in a plurality of external devices. At this time, the stopped external devices are migrated to a specific external storage to be collected, and thus the specific external storage can be stopped.

In the third embodiment, a stopped device rearrangement processing is added to the storage system 130. A program for the stopped device rearrangement processing is stored in the memory 133 of the storage system 130 shown in FIG. 2, in a manner similar to other processing programs. Regarding the stopped device rearrangement processing, the storage system 130 specifies a first external storage as a candidate to be stopped, selects a first external device, which is started, in the first external storage corresponding to a first logical device in the storage system 130, selects a second external device, which is stopped, in a second external storage corresponding to a second logical device in the storage system 130. Then, while receiving the access to the first logical device from the host, the storage system 130 replaces data between the first external device and the second external device, replaces the relationship between the first and the second logical devices and the first and the second external devices at a moment when the replacement of data is completed, and stops the first external storage at a moment when all logical devices in the first external storage are stopped, that is, turns off a power supply.

As an example of a specific processing of the first external storage as the candidate to be stopped, for example, an external storage having a small number of external devices, which are started, from a plurality of external storages may be selected or an external storage having the smallest total amount of I/O load of the external devices which are started may be selected. Further, the first storage as the candidate to be stopped may be selected by the storage administrator or the user, not by the storage system 130, and may be notified to the storage system 130.

As the second external storage 150 and the second external device to be replaced with the first external device which is started, ones having the same conditions as the first external device, such as the size, the device type, or the like are selected. At this time, as the second external storage 150, one having the smallest I/O load may be selected. Moreover, a target to be replaced with the first external device may be a physical device in the storage system 130.

The processing which replaces data between the first external device and the second external device while the I/O to the first logical device is being received from the host 100 is executed by using the cache memory 134 of the storage system 130. First, a predetermined amount of data of the first external device and the second external device is read into the cache memory 134. Then, data of the first external device is written into the second external device and data of the second external device is written into the first external device. At this time, information, such as the external device number of the other party to be replaced, replacement processing progress information, for example, the last address after the replacement is completed, or the like, is added to the logical device management information 201, and a management of an area replaced or not replaced is performed. In the storage system 130, at the time of the I/O request to the first logical device from the host 100, the area replaced or not replaced is judged based on the replacement processing progress information with respect to the first/second external devices during replacement. Then, when the replacement is completed, the second external device is accessed. As for the area not yet replaced, the first external device is accessed.

Finally, regarding the processing that replaces the corresponding relationship between the first and the second logical devices and the first and the second external devices, the corresponding logical device management information 201 or the external device management information 204 is updated and the corresponding relationships between the logical devices and the external devices are replaced one another. At this time, the contents of the entries of the detached device backup information 207 corresponding to the first and the second external devices are replaced one another.

Figure 15:
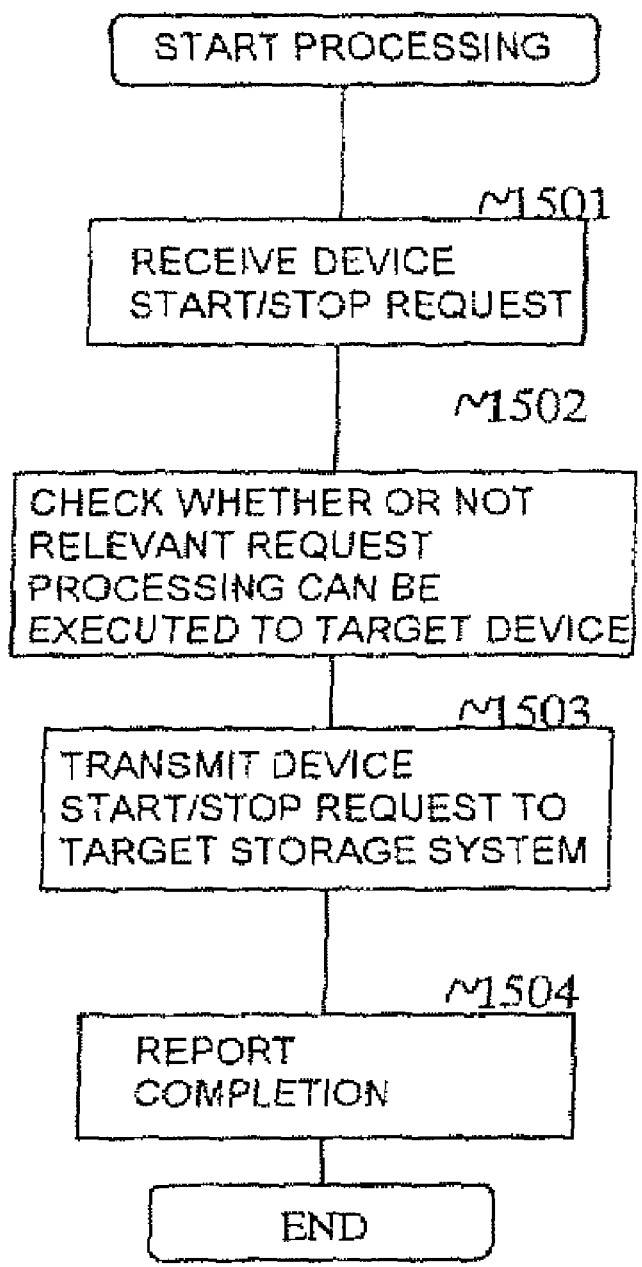
FIG. 15 is a diagram showing an example of a flow of a device start/stop request reception processing, which is executed by a management server 110, in a modification of the first embodiment.
Figure 16:
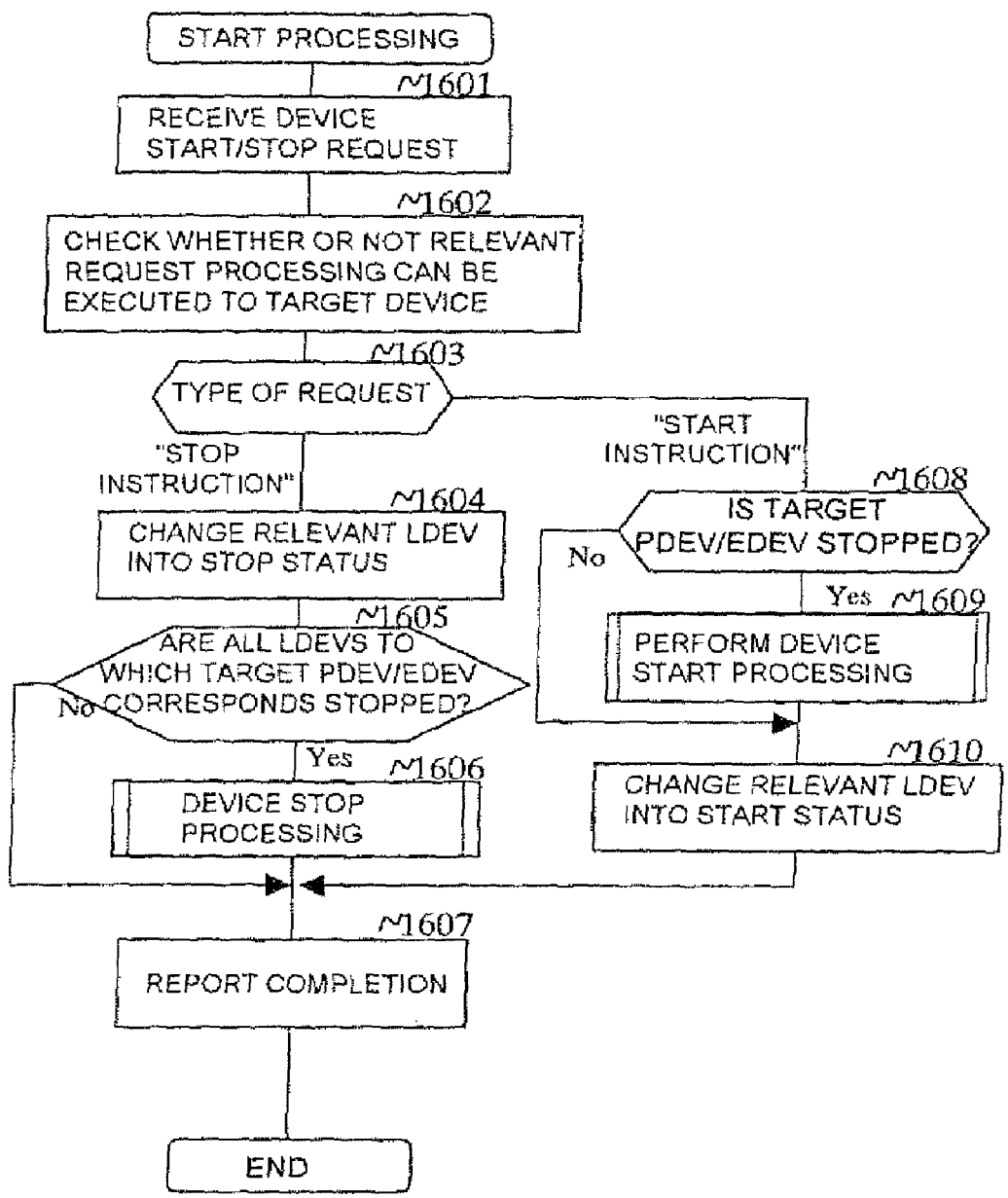
FIG. 16 is a diagram showing an example of a flow of a device start/stop request receiving processing, which is executed by a storage system 130, in a modification of the first embodiment.

Moreover, the present invention is not limited to the above-described embodiments, but various modifications can be achieved. In the first embodiment, at the time of the request to detach from the storage administrator or the host application to the logical device, it is judged whether or not the device needs to be stopped, and when the device needs to be stopped, the device is stopped. Alternatively, only the start/stop request to the device may be received without being accompanied with the detach/attach request. Accordingly, while an access path to the device from the host is maintained, the start/stop operations of the disk device corresponding to the relevant device can be controlled. Moreover, in a modification of the first embodiment, a device start/stop request processing shown in FIG. 15 is executed in the management server 110, instead of the request processing for device connection switching 241, and a device start/stop request receiving processing shown in FIG. 16 is executed in the storage system 130, instead of the device connection switching processing 221. In the device start/stop request processing, according to the device start/stop instruction received from the administrator or the application program, the storage system 130 is instructed to carry out the target device start/stop. Further, in the device start/stop request receiving processing, with respect to the received device start/stop request, a target logical device start/stop processing, a judgment processing of whether or not a corresponding physical device/external device needs to be started/stopped, and, if needed, a physical device/external device start/stop processing are performed.

Further, in the second embodiment, only if the logical device to be detached corresponds to the external device, in addition to the release of the LU path definition, the association between the logical device and the external device is released, such that the logical device number can be allocated to other external devices. Alternatively, for the logical device corresponding to the physical device, the association between the physical device and the logical device may be released. Further, as a modification of the second embodiment, when the logical device is detached, only the logical device and the physical/external device may be released without releasing the correspondence between the logical device and the LU. In this case, like a tape drive and a tape medium of a tape library, other physical/external devices are allocated to the same LU/logical device as viewed from the host. However, even in this case, it is necessary for the application program to recognize the devices again. In particular, when the physical/external devices having different sizes are allocated, it is necessary to recognize the devices again at an operating system level.

Further, in the first and second embodiments, for the target logical device to be detached, the LU path definitions of all ports 131 are released. However, the LU path definition may be released for only a specific port 131 allocated from the user or the application program.

Further, in the second embodiment, the detached device backup information 207 is stored in the control memory 135. However, a portion of a storage space of the external device may be set to a management information storage area and the management information may be backed up in the area. In addition, the content of the external device management information 204 may be stored in the management information storage area of the external device. As such, it is not necessary to continuously manage the external device with the external device management information 204 of the storage system 130. That is, when the logical device corresponding to the external device is detached, the correspondence between the external device number of the storage system 130 and the logical device of the external storage 150 may be released. The user or the application program manages the external device by means of the logical device number or the number of the port 151, the SCSI ID, and the LUN. The storage system 130 accesses to the allocated external device at the time of the attach operation and restores the device management information by using the management information stored in each management information storage area. At this time, in addition to the detached device backup information 207 in the management information storage area of the external device, the identifier of the storage system 130 or the identifier of the port 131 which is used to access the external device from the storage system 130 is stored. Therefore, it can be recognized that the external device is managed by the storage system 130 at the time of the device attach operation. In addition, since a storage system 130 which can define the path and can access is limited based on the information by means of the external storage, a more complete device management can be realized. As such, the management information regarding the external device is stored in the management information area in the external device, and thus, when the storage system 130 which detaches the external device is unable to start due to a failure or the like, the external device can be attached to any other storage system. In this case, however, the identifier of the storage system 130 stored in the management information area needs to be changed by means of the management server 110 or the like.

Further, in the first and second embodiments, the judgment whether or not the device needs to be stopped is performed by the request processing for device connection switching 241 of the management server 110. Alternatively, the judgment may be performed by the device connection switching processing 221.

Further, in the first embodiment, the port 131 and the LUN are assigned when the logical device is attached. Alternatively, any other logical device may be detached and the attach operation may be performed using the port 131 and the LUN. To this end, a protocol to access while confirming a corresponding logical device in advance at the time of starting the access to the LUN from the host may be assumed and the attribute of the logical device is set to 'automatically detachable'. Then, it is preferable that, when the first logical device is attached, after any other 'automatically detachable' second logical device is detached, the first logical device may be detached with the LUN of the port 131 in association with the second logical device. Further, in a manner similar to the second embodiment, it may be controlled such that, by setting the attribute of the external device to 'automatically detachable' and by detaching the second external device when the first external device is attached, the first external device is attached by using the logical device in association with the second external device.

Further, in the first and second embodiments, the start and stop control operations of the disk device 137 corresponding to the physical device of the storage system 130 or the disk device 157 corresponding to the physical device of the external storage 150 are performed by a method in which the command is transmitted to the controller in the disk device 137 (or 157) and the disk rotation is controlled by the controller in the disk device 137 (or 157). Alternatively, the disk device 137 (or 157) may be started/stopped with a switch which is mounted on the storage system 130 (or 150) to turn on/off a power supply to the disk device 137 (or 157).

So far, as described by using the embodiments, according to another embodiment 1 of the present invention, there is provided a computer system, in which the above-described storage system comprises a plurality of storage systems, wherein a first storage system is disposed between the host computer and any other storage system, virtualizes a logical device of the other storage system as the logical device of the first storage system to provide the virtualized logical device to the host computer, receives the detach request, specifies the logical device to be processed by using the information included in the request, releases the definition of the host path of the logical device of the first storage system when the specified logical device corresponds to the logical device of the other storage system, and transmits a request to stop the physical device corresponding to the logical device to the other storage system. The other storage system receives the request to stop the physical device corresponding to the logical device from the one storage system and stops the physical device.

According to other embodiment 2, there is provided a computer system, in which the first storage system releases the correspondence of the logical device of the other storage system corresponding to the logical device of the first storage system.

According to other embodiment 3 of the present invention, there is provided the computer system, in which the storage system receives a request to attach a logical device, specifies a logical device to be processed and a physical device corresponding to the logical device using information included in the request, starts the stopped physical device, and defines the host path of the logical device.

According to other embodiment 4 of the present invention, there is provided the computer system, in which the storage system has a plurality of storage systems, and one storage system is disposed between the host computer and any other storage system, virtualizes a logical device of the other storage system as the logical device of the one storage system to provide the virtualized logical device to the host computer, receives the attach request, specifies the logical device to be processed using the information included in the request, and requests the other storage system to start the physical device corresponding to the logical device when the specified logical device corresponds to the logical device of the other storage system.

According to other embodiment 5 of the present invention, there is provided the computer system, in which the one storage system receives a report on start completion of the physical device corresponding to the logical device from the other storage system, associates the logical device of the other storage system with the logical device of the one storage system, and defines the host path of the logical device of the one storage system.

According to other embodiment 6 of the present invention, there is provided the computer system, in which the storage system has a plurality of storage systems, and one storage system is disposed between the host computer and a plurality of second storage systems, virtualizes logical devices of the plurality of second storage system as logical devices of the one storage system to provide the virtualized logical devices to the host computer, selects a third storage system, which is a migration destination of a stopped logical device, from the plurality of second storage systems, selects the stopped logical device of a second storage system to be migrated from logical devices of the second storage systems excluding the third storage system, selects a logical device in the third storage system which is a migration destination of the selected logical device in the second storage system, starts the stopped logical device in the second storage system, replaces contents of the logical devices of the second and third storage systems with each other by sequentially reading data of the logical devices of the second and third storage systems and by writing the data into the logical devices of the third and second storage systems, respectively, replaces correspondences of the logical devices of the second and third storage systems to the virtualized logical devices of the first storage system with each other, and stops the third storage system itself when all the logical devices in the third storage system are stopped.

According to other embodiment 7 of the present invention, there is provided the computer system, in which the storage system comprises a control processor, a control memory, a memory, and a disk device, wherein the control memory includes control device management information, LU path management information, physical device management information, external device management information, device function management information, the memory stores a copy of device management information, a device connection switching processing, a device start/stop processing, and a stopped device monitoring processing, and the computer system receives a request for device connection switching, checks whether or not the request processing can be executed, stops the relevant physical device at the time of the detach request, and starts the relevant physical device at the time of an attach request.

According to other embodiment 8 of the present invention, there is provided a storage system which constitutes a computer system, together with a host computer and a management server which are connected to each other via a network. The storage system receives a request to detach a logical device, specifies a logical device to be processed and a physical device corresponding to the logical device using information included in the request, releases a definition of a host path of the logical device, and stops the physical device.

According to other embodiment 9 of the present invention, there is provided the storage system, in which the physical device is a disk device and the physical device is stopped by stopping a disk rotation of the disk device.

According to other embodiment 10 of the present invention, there is provided the storage system, in which the storage system receives the detach request of the logical device from the management server.

According to other embodiment 11 of the present invention, there is provided the storage system, in which the storage system receives the detach request from the host computer.

According to other embodiment 12 of the present invention, there is provided the storage system, in which the storage system is disposed between the host computer and any other storage system, virtualizes a logical device of the other storage system as the logical device of the storage system to provide the virtualized logical device to the host computer, receives the detach request, specifies the logical device to be processed using the information included in the request, releases the definition of the host path of the logical device of the storage system when the specified logical device corresponds to the logical device of the other storage system, and transmits a request to stop the physical device corresponding to the relevant logical device to the other storage system, ant the other storage system receives the request to stop the physical device corresponding to the relevant logical device from the storage system and stops the physical device.

According to other embodiment 13 of the present invention, there is provided the storage system, in which the storage system receives a request to attach a logical device, specifies a logical device to be processed and a physical device corresponding to the logical device using the information included in the request, starts the stopped physical device, and defines the host path of the logical device.

According to other embodiment 14 of the present invention, there is provided the storage system, in which the physical device is a disk device and the physical device is started by starting a disk drive of the disk device.

According to other embodiment 15 of the present invention, there is provided the storage system, in which the storage system is disposed between the host computer and any other storage system, virtualizes a logical device of the other storage system as the logical device of the storage system to provide the virtualized logical device to the host computer, receives an attach request, specifies a logical device to be processed using information included in the request, defines the host path of the logical device of the storage system when the specified logical device corresponds to the logical device of the other storage system, and requests the other storage system to start the physical device corresponding to the relevant logical device.

According to other embodiment 16 of the present invention, there is provided the storage system, in which the storage system receives a request to stop a physical device from any other storage system that requests to stop the physical device corresponding to the logical device, stops the physical device, and returns a report on stop completion of the physical device corresponding to the logical device.

According to other embodiment 17 of the present invention, there is provided the storage system, in which the storage system is disposed between the host computer and a plurality of other storage systems, virtualizes logical devices of the plurality of other storage systems as the logical devices of the storage system to provide the virtualized logical devices to the host computer, selects a third storage system, which is a migration destination of a stopped logical device, from a plurality of second storage systems, selects the stopped logical device of a second storage system to be migrated from logical devices of the second storage systems excluding the third storage system, selects a logical device in the third storage system which is a migration destination of the selected logical device in the second storage system, starts the stopped logical device in the second storage system, replaces contents of the logical devices of the second and third storage systems with each other by sequentially reading data of the logical devices of the second and third storage systems and by writing the data into the logical devices of the third and the second storage systems, respectively, replaces correspondences of the logical devices of the second and the third storage systems to the virtualized logical devices of the first storage system with each other, and stops the third storage system itself when all the logical devices in the third storage system are stopped.

According to other embodiment 18 of the present invention, there is provided the storage system, in which a storage system having the largest number of stopped logical devices from the second storage systems is selected as the third storage system.

According to other embodiment 19 of the present invention, there is provided a management server which constitutes a computer system, together with a host computer and a storage system connected to each other via a network. The management server receives a detach instruction of a logical device in the storage system, judges whether or not the logical device in the storage system needs to be stopped from the information included in the instruction, and transmits a detach request of the logical device to the storage system.

According to other embodiment 20 of the present invention, there is provided a device control method of a computer system in which a host computer, a storage system, and a management server are connected to one another via a network, wherein the device control method comprises receiving a request to detach a logical device, specifying a logical device to be processed and a physical device corresponding to the logical device using information included in the request, releasing a definition of a host path of the logical device, and stopping the physical device.

According to other embodiment 21 of the present invention, there is provided a device control method of a computer system in which a host computer, a storage system, and a management server are connected to one another via a network, wherein the device control method comprises receiving a request to attach a logical device, specifying a logical device to be processed and a physical device corresponding to the logical device using information included in the request, starting a stopped physical device, and defining the host path of the logical device.

According to other embodiment 22 of the present invention, there is provided a device control method of a computer system in which a host computer, a storage system, and a management server are connected to one another via a network, wherein the storage system has a plurality of storage systems and one storage system is disposed between the host computer and a plurality of second storage systems. The device control method virtualizes logical devices of the plurality of second storage systems as the logical devices of the one storage system to provide the virtualized logical devices to the host computer, selects a third storage system, which is a migration destination of a stopped logical device, from the plurality of second storage systems, selects the stopped logical device of a second storage system to be migrated from logical devices of the second storage systems excluding the third storage system, selects a logical device in the third storage system which is a migration destination of the selected logical device of the second storage system, starts the stopped logical device of the second storage system, replaces contents of the logical devices of the second and the third storage systems with each other by sequentially reading data of the logical devices of the second and the third storage systems and by writing the data into the logical devices of the third and the second storage systems, respectively, and stops the third storage system itself when all the logical devices in the third storage system are stopped.

What is claimed is:

1. A storage system coupled to a management server comprising:
   a processor which controls an Input/Output (I/O) request from a host computer;
   a plurality of physical devices including a first physical device; and
   a memory storing status information of the plurality of physical devices, the status information indicating a status of the plurality of the physical devices,
   wherein the processor changes power supply for the plurality of physical devices,
   wherein when the power supply for the first physical device is stopped, the processor starts the power supply for the first physical device, and then confirms operation of the first physical device, and then stops the power supply for the first physical device, and
   wherein if the first physical device has a failure during starting of the power supply, or if the first physical device has an operation error during confirming operation of the first physical device, or if the first physical device has a failure during stopping of the power supply for the first physical device, the processor transmits an error report to the management server,
   wherein if a failure of the power supply to start, an operation error, or a failure of the power supply to stop for the first physical device occurs, the processor registers the status of the first physical device in the status information as a blocked status, and
   wherein the blocked status is the status when the first physical device is started, then operation is confirmed through a test I/O, and the first physical device is stopped again.

2. The storage system according to claim 1, wherein the processor confirms operation of the physical device through a test I/O.

3. The storage system according to claim 1, wherein the test I/O is a diagnostic command transmission such as a sense information reference, a read access to user data itself, and a read/write access to a blank disk or a blank area in a device.

4. The storage system according to claim 1, wherein steps of monitoring are repeatedly performed, and after the steps are completed for all external devices, the steps of monitoring end.

5. The storage system according to claim 4, wherein the first physical device start/stop processing is executed by the storage system.

6. The storage system according to claim 1,
   wherein when the storage system receives a request to detach a logical device included in a plurality of the logical devices, the processor releases a definition of a path between the host computer and the logical device, and sets a status of the logical device to stop.

7. The storage system according to claim 1,
   wherein the processor specifies a physical device corresponding to the logical device using information included in the request, and if a status of other logical devices which correspond to the physical device are set to a status of stop, then the processor stops the power supply for the physical device.

8. A monitoring method of a stopped device executed by a storage system coupled to a management server, the storage system comprising a processor, a plurality of physical devices including a first physical device, and a memory, the monitoring method comprising:
   controlling, by the processor, an Input/Output (I/O) request from a host computer;
   changing, by the processor, power supply for the plurality of physical devices; and
   storing, by the memory, status information of the plurality of physical devices, the status information indicating a status of the plurality of the physical devices,
   wherein when the power supply for the first physical device is stopped, the processor starts the power supply for the first physical device, and then confirms operation of the first physical device, and then stops the power supply for the first physical device,
   wherein if the first physical device has a failure during starting of the power supply for the first physical device, or if the first physical device has an operation error during confirming operation of the first physical device, or if the first physical device has a failure during stopping of the power supply for the first physical device, the processor transmits an error report to the management server,
   wherein if a failure of the power supply to start, an operation error, or a failure of the power supply to stop for the first physical device occurs, the processor registers status of the first physical device in the status information as a blocked status, and
   wherein the blocked status is the status when the first physical device is started, then operation is confirmed through a test I/O, and the first physical device is stopped again.

9. The monitoring method according to claim 8, wherein the processor confirms operation of the first physical device through a test I/O.

10. The monitoring method according to claim 8, wherein the test I/O is a diagnostic command transmission such as a sense information reference, a read access to user data itself, and a read/write access to a blank disk or a blank area in a device.

11. The monitoring method according to claim 8, wherein steps of monitoring are repeatedly performed, and after the steps are completed for all external devices, the steps of monitoring end.

12. The monitoring method according to claim 11 wherein the first physical device start/stop processing is executed by the storage system.

* * * * *